United States Patent
Wang et al.

(10) Patent No.: US 12,554,987 B2
(45) Date of Patent: Feb. 17, 2026

(54) COMPUTER-IMPLEMENTED METHODS AND SYSTEMS FOR DNN WEIGHT PRUNING FOR REAL-TIME EXECUTION ON MOBILE DEVICES

(71) Applicant: Northeastern University, Boston, MA (US)

(72) Inventors: Yanzhi Wang, Newton Highlands, MA (US); Xiaolong Ma, Boston, MA (US)

(73) Assignee: Northeastern University, Boston, MA (US)

( * ) Notice: Subject to any disclaimer, the term of this patent is extended or adjusted under 35 U.S.C. 154(b) by 969 days.

(21) Appl. No.: 17/176,742

(22) Filed: Feb. 16, 2021

(65) Prior Publication Data
US 2021/0256385 A1    Aug. 19, 2021

Related U.S. Application Data
(60) Provisional application No. 62/976,613, filed on Feb. 14, 2020.

(51) Int. Cl.
*G06N 3/082* (2023.01)
*G06F 18/2136* (2023.01)
*G06N 3/04* (2023.01)

(52) U.S. Cl.
CPC ......... *G06N 3/082* (2013.01); *G06F 18/2136* (2023.01); *G06N 3/04* (2013.01)

(58) Field of Classification Search
None
See application file for complete search history.

(56) References Cited

U.S. PATENT DOCUMENTS 10,366,322 B2 *   7/2019   David ................... G06N 3/045
10,489,703 B2 *  11/2019   Yang .................... G06V 10/454
(Continued)

FOREIGN PATENT DOCUMENTS

WO    WO-2019/086104 A1    5/2019

OTHER PUBLICATIONS

Yang, Maurice et al. "Efficient Hardware Realization of Convolutional Neural Networks using Intra-Kernel Regular Pruning" (pp. 180-185), 2018 IEEE. <https://ieeexplore.ieee.org/document/8416942> (Year: 2018).*

(Continued)

*Primary Examiner* — Tamara T Kyle
*Assistant Examiner* — Tyler Schallhorn
(74) *Attorney, Agent, or Firm* — Foley Hoag LLP; Dana M. Gordon; Erik A. Huestis

(57) ABSTRACT

A computer-implemented method is disclosed for compressing a deep neural network (DNN) model by DNN weight pruning to accelerate DNN inference on mobile devices. The method includes the steps of (a) performing an intra-convolution kernel pruning of the DNN model wherein a fixed number of weights are pruned in each convolution kernel of the DNN model to generate sparse convolution patterns; (b) performing inter-convolution kernel pruning of the DNN model to generate connectivity sparsity, wherein inter-convolution kernel pruning comprises cutting connections between given input and output channels of the DNN model to remove corresponding kernels; and (c) training the DNN model compressed in steps (a) and (b).

18 Claims, 18 Drawing Sheets

(56) References Cited

U.S. PATENT DOCUMENTS

| | | | | |
|---|---|---|---|---|
| 10,740,659 | B2* | 8/2020 | Chen | G06F 18/214 |
| 10,755,136 | B2* | 8/2020 | Kadav | G06V 10/454 |
| 10,796,169 | B2* | 10/2020 | Kadav | G06V 10/82 |
| 10,832,133 | B2* | 11/2020 | Matveev | G06N 3/082 |
| 11,093,832 | B2* | 8/2021 | Chen | G06N 3/084 |
| 11,176,439 | B2* | 11/2021 | Chen | G06N 3/045 |
| 11,544,559 | B2* | 1/2023 | Kopinsky | G06N 3/08 |
| 11,625,607 | B2* | 4/2023 | Wang | G06N 3/045 706/25 |
| 11,995,551 | B2* | 5/2024 | Koivisto | G06N 3/082 |
| 2016/0342888 | A1* | 11/2016 | Yang | G06V 10/454 |
| 2017/0249921 | A1 | 8/2017 | Meixner et al. | |
| 2018/0096226 | A1 | 4/2018 | Aliabadi et al. | |
| 2018/0336425 | A1* | 11/2018 | Kadav | G06V 10/82 |
| 2018/0336431 | A1* | 11/2018 | Kadav | G06N 3/04 |
| 2018/0336468 | A1* | 11/2018 | Kadav | G06V 10/454 |
| 2019/0108436 | A1* | 4/2019 | David | G06N 3/045 |
| 2019/0122113 | A1* | 4/2019 | Chen | G06N 3/084 |
| 2019/0156201 | A1 | 5/2019 | Bichler et al. | |
| 2019/0164037 | A1* | 5/2019 | Kim | G06N 3/04 |
| 2019/0171926 | A1* | 6/2019 | Chen | G06N 3/04 |
| 2019/0188526 | A1* | 6/2019 | Chen | G06F 18/24 |
| 2019/0188567 | A1* | 6/2019 | Yao | G06N 3/082 |
| 2019/0251442 | A1* | 8/2019 | Koivisto | G06N 3/045 |
| 2019/0311298 | A1 | 10/2019 | Kopp et al. | |
| 2019/0362235 | A1* | 11/2019 | Xu | G06N 3/084 |
| 2020/0134461 | A1 | 4/2020 | Chai et al. | |
| 2020/0160182 | A1* | 5/2020 | Matveev | G06N 3/045 |
| 2020/0218978 | A1* | 7/2020 | Kopinsky | G06N 20/10 |
| 2021/0097393 | A1* | 4/2021 | Wang | G06F 1/03 |
| 2021/0158131 | A1 | 5/2021 | Jain et al. | |
| 2021/0182077 | A1 | 6/2021 | Chen et al. | |
| 2021/0192352 | A1 | 6/2021 | Wang et al. | |
| 2021/0256383 | A1 | 8/2021 | Wang et al. | |
| 2021/0256384 | A1 | 8/2021 | Wang et al. | |
| 2022/0067527 | A1 | 3/2022 | Xu et al. | |
| 2023/0056315 | A1* | 2/2023 | Wang | G06N 3/082 |
| 2024/0104375 | A1* | 3/2024 | Park | G06N 3/08 |

OTHER PUBLICATIONS

Anwar, Sajid et al. "Structured Pruning of Deep Convolutional Neural Networks" (pp. 32:1-32:18), 2017 ACM. <http://dx.doi.org/10.1145/3005348> (Year: 2017).*

Ma, Xiaolong et al. "An Image Enhancing Pattern-Based Sparsity for Real-Time Inference on Mobile Devices" (pp. 629-645), 2020 Springer. <https://doi.org/10.1007/978-3-030-58601-0_37> (Year: 2020).*

Ma, Xiaolong et al. "PCONV: The Missing but Desirable Sparsity in DNN Weight Pruning for Real-Time Execution on Mobile Devices" (pp. 5117-5124), 2020 AAAI. <https://doi.org/10.1609/aaai.v34i04.5954> (Year: 2020).*

Huang, Qiangui et al. "Learning to Prune Filters in Convolutional Neural Networks" (pp. 709-718), 2018 IEEE. <https://ieeexplore.ieee.org/abstract/document/8354187> (Year: 2018).*

Niu, Wei et al. "PatDNN: Achieving Real-Time DNN Execution on Mobile Devices with Pattern-based Weight Pruning", Jan. 22, 2020, Association for Computing Machinery. <https://doi.org/10.48550/arXiv.2001.00138> (Year: 2020).*

Blakemore et al., "On the existence of neurones in the human visual system selectively sensitive to the orientation and size of retinal images." The Journal of Physiology 203.1 (1969):237-260.

Boticki et al., "Quiet captures: A tool for capturing the evidence of seamless learning with mobile devices." International Conference of the Learning Sciences 1 (2010).

Boyd et al., "Distributed optimization and statistical learning via the alternating direction method of multipliers." Foundations and Trends in Machine Learning 3(1) (2010): 1-122.

Chen et al., "TVM: An Automated End-to-End Optimizing Compiler for Deep Learning." 13th USENIX Symposium on Operating Systems Design and Implementation (OSDI 18). 2018.

Dai et al., "NeST: A neural network synthesis tool based on a grow-and-prune paradigm." IEEE Transactions on Computers (2019): 1487-1497.

Freeman et al., "The design and use of steerable filters." IEEE Transactions on Pattern Analysis and Machine Intelligence 13 (1991): 891-906.

Goodfellow et al., "Deep learning", MIT press, (2016).

Han et al., "Deep compression: Compressing deep neural networks with pruning, trained quantization and huffman coding." arXiv preprint arXiv:1510.00149 (2015).

Han et al., "Learning both Weights and Connections for Efficient Neural Network." Advances in Neural Information Processing Systems 28 (2015).

He et al., "Channel pruning for accelerating very deep neural networks." Proceedings of the IEEE international conference on computer vision. 2017.

He et al., "Amc: Automl for model compression and acceleration on mobile devices." Proceedings of the European conference on computer vision (ECCV). 2018.

He et al., "Deep residual learning for image recognition." Proceedings of the IEEE conference on computer vision and pattern recognition. 2016.

He et al., "Filter pruning via geometric median for deep convolutional neural networks acceleration." Proceedings of the IEEE/CVF conference on computer vision and pattern recognition. 2019.

Hinton et al., "Deep neural networks for acoustic modeling in speech recognition: The shared views of four research groups." IEEE Signal processing magazine 29.6 (2012): 82-97.

Howard et al., "Mobilenets: Efficient convolutional neural networks for mobile vision applications." arXiv preprint arXiv:1704.04861 (2017).

Hu et al., "Network trimming: A data-driven neuron pruning approach towards efficient deep architectures." arXiv preprint arXiv:1607.03250 (2016).

Huang et al., "Data-driven sparse structure selection for deep neural networks." Proceedings of the European conference on computer vision (ECCV). 2018.

Kingma et al., "Adam: A method for stochastic optimization." Proceedings of the International Conference on Learning Representations (2014).

Krizhevsky et al., "ImageNet Classification with Deep Convolutional Neural Networks." Advances in Neural Information Processing Systems 25 (2012).

Lane et al., "An early resource characterization of deep learning on wearables, smartphones and internet-of-things devices." Proceedings of the 2015 International Workshop on Internet of Things Towards Applications. 2015.

Li et al., "Pruning filters for efficient convnets." ICLR (2017).

Liu et al., "Rethinking the value of network pruning." arXiv preprint arXiv:1810.05270 (2019).

Liu et al., "Sparse convolutional neural networks." Proceedings of the IEEE conference on computer vision and pattern recognition. 2015.

Luo et al., "A filter level pruning method for deep neural network compression." In Proceedings of the IEEE international conference on computer vision, 5058-5066.

Ma et al., "The power of interpolation: Understanding the effectiveness of SGD in modern over-parametrized learning." *International Conference on Machine Learning*. PMLR, 2018.

Mahendran et al., "Understanding deep image representations by inverting them." *Proceedings of the IEEE conference on computer vision and pattern recognition*. 2015.

Mairal et al., "Convolutional Kernel Networks." Advances in Neural Information Processing Systems 27 (2014).

Mao et al., "Exploring the regularity of sparse structure in convolutional neural networks", arXiv preprint arXiv:1705.08922, (2017).

Min et al., "2pfpce: Two-phase filter pruning based on conditional entropy." arXiv preprint arXiv:1809.02220 (2018).

Parashar et al., "SCNN: An accelerator for compressed-sparse; convolutional neural networks." arXiv (2017).

Philipp et al., "A sensor network abstraction for flexible public sensing systems." IEEE Eighth International Conference on Mobile Ad-Hoc and Sensor Systems. IEEE, 2011.

(56) References Cited

OTHER PUBLICATIONS

Ren et al., "Admm-nn: An algorithm-hardware co-design framework of dnns using alternating direction methods of multipliers." Proceedings of the Twenty-Fourth International Conference on Architectural Support for Programming Languages and Operating Systems. 2019.
Ren et al., "Faster r-cnn: Towards real-time object detection with region proposal networks." Advances in neural information processing systems (2015).
Selvaraju et al., "Grad-cam: Visual explanations from deep networks via gradient-based localization." *Proceedings of the IEEE international conference on computer vision*. 2017.
Simonyan et al., "Very deep convolutional networks for large-scale image recognition", arXiv preprint arXiv:1409.1556 (2014).
Springenberg et al., "Striving for simplicity: The all convolutional net." *arXiv preprint* arXiv:1412.6806 (2015).
Sundararajan et al., "Axiomatic attribution for deep networks." International Conference on Machine Learning. PMLR, 2017.
Wen et al., "Learning structured sparsity in deep neural networks." *Advances in Neural Information Processing Systems* 29 (2016).
Xu et al., "Deepcache: Principled cache for mobile deep vision." *Proceedings of the 24th annual international conference on mobile computing and networking*. 2018.
Yamins et al., "Using goal-driven deep learning models to understand sensory cortex." *Nature Neuroscience* 19(3) (2016): 356-365.
Yao et al., "Deepsense: A unified deep learning framework for time-series mobile sensing data processing." *Proceedings of the 26th International Conference on World Wide Web*. 2017.
Yu et al., "Nisp: Pruning networks using neuron importance score propagation." Proceedings of the IEEE conference on computer vision and pattern recognition. 2018.
Zhang et al,. "Systematic weight pruning of dnns using alternating direction method of multipliers." arXiv preprint arXiv:1802.05747 (2018).
Zhang, "Making convolutional networks shift-invariant again." *International Conference on Machine Learning*. PMLR, 2019.
Aghasi et al., "Net-trim: Convex pruning of deep neural networks with performance guarantee", Advances in neural information processing systems 30 (2017).
Ashok et al., "N2n learning: Network to network compression via policy gradient reinforcement learning," Proceedings of International Conference on Learning Representations (ICLR), 2018 (21 pages).
Bang et al., "14.7 a 288 µw programmable deep-learning processor with 270kb on-chip weight storage using non-uniform memory hierarchy for mobile intelligence", 2017 IEEE International Solid-State Circuits Conference (ISSCC). IEEE, pp. 250-251 (2017).
Chen et al., "Dadiannao: A machine-learning supercomputer." 2014 47th Annual IEEE/ACM International Symposium on Microarchitecture. IEEE, (2014).
Chen et al., "Data-free learning of student networks," In: Proceedings of the IEEE International Conference on Computer Vision (ICCV) (2019): pp. 3514-3522.
Chen et al., "Diannao: A small-footprint high-throughput accelerator for ubiquitous machine-learning", ACM SIGARCH Computer Architecture News 42.1: 269-284 (2014).
Chen et al., "Eyeriss: An energy-efficient reconfigurable accelerator for deep convolutional neural networks." IEEE journal of solid-state circuits 52.1: 127-138 (2016).
Courbariaux et al., "Binaryconnect: Training deep neural networks with binary weights during propagations." Advances in neural information processing systems 28 (2015).
Deng et al., "Imagenet: A large-scale hierarchical image database." 2009 IEEE conference on computer vision and pattern recognition. Ieee, pp. 248-255, 2009.
Denton et al., "Exploiting linear structure within convolutional networks for efficient evaluation", Advances in neural information processing systems 27: 1269-1277 (2014).

Desoli et al., "14.1 A 2.9 TOPS/W deep convolutional neural network SoC in FD-SOI 28nm for intelligent embedded systems." 2017 IEEE International Solid-State Circuits Conference (ISSCC). IEEE, 238-239, (2017).
Dieleman et al., "Exploiting cyclic symmetry in convolutional neural networks," In: Proceedings of the International Conference on Machine Learning (ICML). vol. 48 (106): 1889-1898.
Ding et al., "Circnn: accelerating and compressing deep neural networks using block-circulant weight matrices." Proceedings of the 50th Annual IEEE/ACM International Symposium on Microarchitecture pp. 395-408. (2017).
Dong et al., "Learning to prune deep neural networks via layer-wise optimal brain surgeon." Advances in neural information processing systems 30: 4857-4867 (2017).
Du et al., "ShiDianNao: Shifting vision processing closer to the sensor", Proceedings of the 42nd annual international symposium on computer architecture. 92-104 (2015).
Guo et al., "Dynamic network surgery for efficient dnns." Advances in neural information processing systems 29 (2016).
Guo et al., "Software-hardware codesign for efficient neural network acceleration." IEEE Micro 37.2: 18-25 (2017).
Han et al., "Dsd: Dense-sparse-dense training for deep neural networks." arXiv preprint arXiv:1607.04381 (2016).
Han et al., "EIE: Efficient inference engine on compressed deep neural network." ACM SIGARCH Computer Architecture News 44.3: 243-254 (2016).
Han et al., "Ese: Efficient speech recognition engine with sparse lstm on fpga." Proceedings of the 2017 ACM/SIGDA International Symposium on Field-Programmable Gate Arrays. pp. 75-84 (2017).
He et al., "Asymptotic soft filter pruning for deep convolutional neural networks," IEEE Transactions on Cybernetics (2019).
Hinton et al., "Distilling the knowledge in a neural network," arXiv preprint arXiv:1503.02531 (2015) (9 pages).
Hubara et al., "Binarized neural networks." Advances in neural information processing systems 29: 4107-4115 (2016).
Jin et al., "Extremely low bit neural network: Squeeze the last bit out with ADMM" arXiv.org. (2017).
Jochems et al., "Developing and validating a survival prediction model for nsclc patients through distributed learning across 3 countries," International Journal of Radiation Oncology* Biology* Physics 99(2) (2017): 344-352.
Jochems et al., "Distributed learning: developing a predictive model based on data from multiple hospitals without data leaving the hospital-a real life proof of concept," Radiotherapy and Oncology 121(3) (2016): 459-467.
Judd et al., "Stripes: Bit-serial deep neural network computing." 2016 49th Annual IEEE/ACM International Symposium on Microarchitecture (MICRO). IEEE, 12 pages, (2016).
Kingma et al., "A method for stochastic optimization." arXiv preprint arXiv:1412.6980 (2014).
Kwon et al., "Maeri: Enabling flexible dataflow mapping over dnn accelerators via reconfigurable interconnects." ACM SIGPLAN Notices 53.2: 461-475 (2018).
Lecun et al., "Lenet-5, convolutional neural networks", URL: http://yann.lecun.com/exdb/lenet, 20(5): 14 (2015).
Leng et al., "Extremely low bit neural network: Squeeze the last bit out with admm." Proceedings of the AAAI Conference on Artificial Intelligence. vol. 32. No. 1. (2018).
Li et al., "Layer-level knowledge distillation for deep neural network learning," Applied Sciences 9(10), (2019): 1966.
Lin et al., "Fixed point quantization of deep convolutional networks." International conference on machine learning. PMLR, pp. 2849-2858, (2016).
Liu et al., "Autoslim: An automatic dnn structured pruning framework for ultra-high compression rates," arXiv preprint arXiv: 1907.03141 (2019) (10 pages).
Liu et al., "Learning efficient convolutional networks through network slimming," In: Proceedings of the IEEE International Conference on Computer Vision (ICCV) (2017): 2736-2744.
Mahajan et al., "Tabla: A unified template-based framework for accelerating statistical machine learning." 2016 IEEE International Symposium on High Performance Computer Architecture (HPCA). IEEE, pp. 14-26, (2016).

(56) References Cited

OTHER PUBLICATIONS

Matsumoto, "Intel's Deep Learning Chips Will Arrive in 2017", SDX Central, retrieved online: https://www.sdxcentral.com/articles/news/intels-deep-learning-chips-will-arrive-2017/2016/11/ (2016).
MNN, "alibaba/MNN," available at https://github.com/alibaba/MNN, first published 2020.
Moons et al., "14.5 envision: A 0.26-to-10tops/w subword-parallel dynamic-voltage-accuracy-frequency-scalable convolutional neural network processor in 28nm fdsoi", 2017 IEEE International Solid-State Circuits Conference (ISSCC). IEEE, pp. 246-247 (2017).
Nayak et al., "Zero-shot knowledge distillation in deep networks," In: Proceedings of the International Conference on International Machine Learning (ICML) (2019): 4743-4751.
Osborne, "Google's Tensor Processing Unit explained: this is what the future of computing looks like", TechRadar Silicon Week, retrieved online: https://www.techradar.com/news/computing-components/processors/google-s-tensor-processing-unit-explained-this-is-what-the-future-of-computing-looks-like-1326915 (2016).
Ouyang et al., "Stochastic alternating direction method of multipliers." International conference on machine learning. PMLR, pp. 80-88 (2013).
Parashar et al., "An accelerator for compressed-sparse convolutional neural networks", In ACM SIGARCH Computer Architecture News, vol. 45, ACM, pp. 27-40 (2017).
Park et al., "Weighted-entropy-based quantization for deep neural networks." Proceedings of the IEEE Conference on Computer Vision and Pattern Recognition, pp. 7197-7205 (2017).
Qiu et al., "Going deeper with embedded FPGA platform for convolutional neural network." Proceedings of the 2016 ACM/SIGDA international symposium on field-programmable gate arrays. pp. 26-35 (2016).
Rastegari et al., "Xnor-net: Imagenet classification using binary convolutional neural networks", European conference on computer vision. Cham: Springer International Publishing pp. 525-542 (2016).
Reagen et al., "Minerva: Enabling low-power, highly-accurate deep neural network accelerators." ACM SIGARCH Computer Architecture News 44.3: 267-278 (2016).
Sharma et al., "From high-level deep neural models to FPGAs." 2016 49th Annual IEEE/ACM International Symposium on Microarchitecture (MICRO). IEEE, pp. 1-13 (2016).
Sim et al., "14.6 a 1.42 tops/w deep convolutional neural network recognition processor for intelligent ioe systems." 2016 IEEE International Solid-State Circuits Conference (ISSCC). IEEE, pp. 264-265 (2016).
Song et al., "In-situ ai: Towards autonomous and incremental deep learning for iot systems." 2018 IEEE International Symposium on High Performance Computer Architecture (HPCA). IEEE: pp. 92-103, (2018).
Suda et al., "Throughput-optimized OpenCL-based FPGA accelerator for large-scale convolutional neural networks", Proceedings of the 2016 ACM/SIGDA international symposium on field-programmable gate arrays, pp. 16-25 (2016).
Suzuki, "Dual averaging and proximal gradient descent for online alternating direction multiplier method", International Conference on Machine Learning. PMLR, pp. 392-400 (2013).
Tai et al., "Convolutional neural networks with low-rank regularization," In: Proceedings of International Conference on Learning Representations (ICLR) (2016) (11 pages).
TensorFlow, "Model optimization," available at https://www.tensorflow.org/lite/performance/model_optimization, last updated Oct. 20, 2021.
Umuroglu et al., "Finn: A framework for fast, scalable binarized neural network inference." Proceedings of the 2017 ACM/SIGDA international symposium on field-programmable gate arrays, pp. 65-74 (2017).
Venkataramani et al., "Scaledeep: A scalable compute architecture for learning and evaluating deep networks." Proceedings of the 44th Annual International Symposium on Computer Architecture. pp. 13-26 (2017).
Wang et al., "Private model compression via knowledge distillation," In: Proceedings of the AAAI Conference on Artificial Intelligence. vol. 33 (2019): 1190-1197.
Whatmough et al., "14.3 A 28nm SoC with a 1.2 GHz 568nJ/ prediction sparse deep-neural-network engine with> 0.1 timing error rate tolerance for IoT applications." 2017 IEEE International Solid-State Circuits Conference (ISSCC). IEEE: pp. 242-243, (2017).
Wu et al., "Quantized convolutional neural networks for mobile devices." Proceedings of the IEEE conference on computer vision and pattern recognition, pp. 4820-4828 (2016).
Yang et al., "Designing energy-efficient convolutional neural networks using energy-aware pruning." Proceedings of the IEEE conference on computer vision and pattern recognition, pp. 6071-6079 (2017).
Ye et al., "A unified framework of dnn weight pruning and weight clustering/quantization using ADMM." arXiv preprint arXiv:1811.01907 (2018).
Ye et al., "Progressive weight pruning of deep neural networks using ADMM." arXiv preprint arXiv:1810.07378 (2018).
Yin et al., "Dreaming to distill: Data-free knowledge transfer via deepinversion." Proceedings of the IEEE/CVF Conference on Computer Vision and Pattern Recognition. 2020.
Yu et al., "On compressing deep models by low rank and sparse decomposition." Proceedings of the IEEE conference on computer vision and pattern recognition. pp. 7370-7379, (2017).
Yu et al., "Scalpel: Customizing dnn pruning to the underlying hardware parallelism." ACM SIGARCH Computer Architecture News 45.2: 548-560 (2017).
Yuan et al., "Sticker: A 0.41-62.1 TOPS/W 8Bit neural network processor with multi-sparsity compatible convolution arrays and online tuning acceleration for fully connected layers." 2018 IEEE symposium on VLSI circuits. IEEE: pp. 33-34 (2018).
Zhai et al., "Doubly convolutional neural networks," In: Advances in Neural Information Processing Systems (NeurIPS) (2016): 1082-1090.
Zhang et al., "A systematic dnn weight pruning framework using alternating direction method of multipliers." Proceedings of the European conference on computer vision (ECCV). (2018).
Zhang et al., "Adam-admm: A unified, systematic framework of structured weight pruning for dnns," arXiv:1807.11091 (2018).
Zhang et al., "Caffeine: Towards uniformed representation and acceleration for deep convolutional neural networks", Proceedings of the ACM Turing Award Celebration Conference—China 2023. (2023).
Zhang et al., "Energy-efficient CNN implementation on a deeply pipelined FPGA cluster", Proceedings of the 2016 International Symposium on Low Power Electronics and Design, pp. 326-331 (2016).
Zhang et al., "Learning to share: Simultaneous parameter tying and sparsification in deep learning", International Conference on Learning Representations. (2018).
Zhao et al., "Accelerating binarized convolutional neural networks with software-programmable FPGAs", Proceedings of the 2017 ACM/SIGDA International Symposium on Field-Programmable Gate Arrays. pp. 15-24 (2017).
Zhao et al., "Variational convolutional neural network pruning," In: Proceedings of the IEEE Conference on Computer Vision and Pattern Recognition (CVPR) (2019): 2780-2789.
Zhou et al., "Incremental network quantization: Towards lossless cnns with low-precision weights", arXiv preprint arXiv:1702.03044 (2017).
Zhu et al., "Improving deep neural network sparsity through decorrelation regularization," In: Proceedings of International Joint Conferences on Artificial Intelligence (IJCAI) (2018): 3264-3270.
Zhu, Chenzhuo, et al. "Trained ternary quantization." In International Conference on Learning Representations, arXiv preprint arXiv:1612.01064 (2016).
Zhuang et al., "Discrimination-aware channel pruning for deep neural networks," In: Advances in Neural Information Processing Systems (NeurIPS) (2018): 875-886.

* cited by examiner

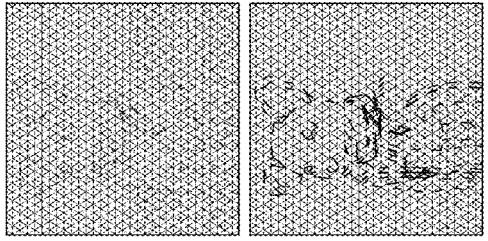
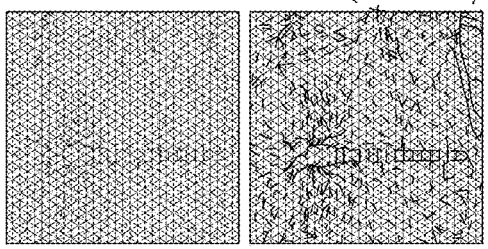
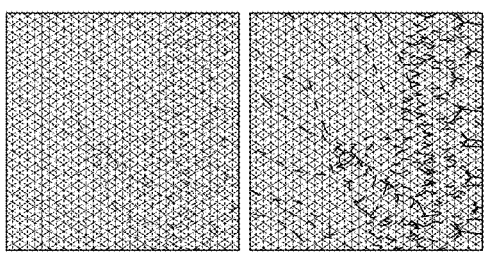
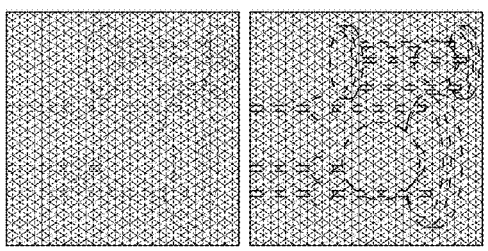
(b). Integrated gradient
FIG. 10B
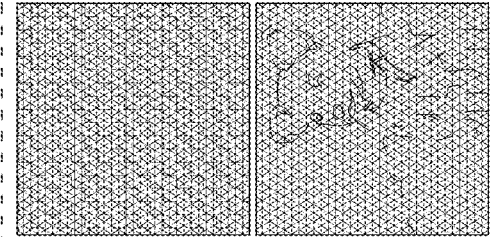
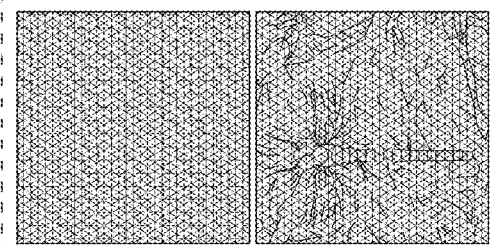
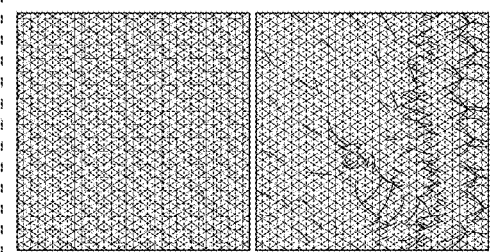
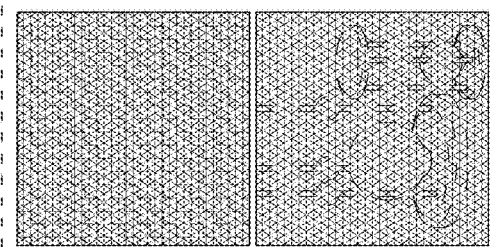
(c). Inverted representation
FIG. 10C Table 1: Pattern counts vs. performance. Evaluation uses model with pattern (2.25×) and connectivity (8.8×) sparsity on VGG-16 Cifar-10 dataset. Top-1 accuracy displayed.

| Dataset | Pattern# | Acc. (%) | Acc. loss (%) | Device | Speed (ms) |
|---|---|---|---|---|---|
| Cifar-10 | 4 | 93.8 | -0.3 | CPU | 2.7 |
| | | | | GPU | 2.9 |
| | 8 | 93.7 | -0.2 | CPU | 2.9 |
| | | | | GPU | 3.0 |
| | 12 | 93.8 | -0.3 | CPU | 3.1 |
| | | | | GPU | 3.3 |

FIG. 11

Table 2: Pattern counts vs. performance. Evaluation uses model with pattern (2.25×) and connectivity (3.1×) sparsity on VGG-16 ImageNet dataset. Top-5 accuracy displayed.

| Dataset | Pattern# | Acc. (%) | Acc. loss (%) | Device | Speed (ms) |
|---|---|---|---|---|---|
| ImageNet | 4 | 91.5 | 0.2 | CPU | 57.7 |
|  |  |  |  | GPU | 19.1 |
|  | 8 | 91.6 | 0.1 | CPU | 58.9 |
|  |  |  |  | GPU | 22.0 |
|  | 12 | 91.6 | 0.1 | CPU | 105.2 |
|  |  |  |  | GPU | 32.1 |

FIG. 12

Table 3: PCONV and non-structured pruning comparison on ImageNet using VGG-16 and ResNet-50. We select widely-acknowledged works as our baseline: Deep Compression (Han, Mao, and Dally 2015), NeST (Dai, Yin, and Jha 2017), ADMM-NN (Ren et al. 2019), SSS (Huang and Wang 2018) and Fine-grained pruning (Mao et al. 2017).

| | Method | Top-5 Accuracy | CONV Compression rate |
|---|---|---|---|
| VGG-16 | Deep compression | 88.7% | 3.5x |
| | NeST | 90.1% | 6.5x |
| | ADMM-NN | 88.9% | 10.2x |
| | Our's (pattern + connectivity) | 91.5% | 7.0x |
| ResNet-50 | Fine-grained pruning | 92.3% | 2.6x |
| | SSS-32 | 91.8% | 1.4x |
| | SSS-26 | 90.8% | 1.6x |
| | ADMM-NN | 92.3% | 7.0x |
| | Our's (pattern + connectivity) | 92.6% | 3.9x |

FIG. 13

Table 4: PCONV and structured pruning comparison on ImageNet using VGG-16 and ResNet-50. We select widely- acknowledged works as our baseline: ThiNet (Luo, Wu, and Lin 2017), APOZ (Hu et al. 2016) and Efficient ConvNet (Li et al. 2016)

|  | Method | Top-5 Accuracy | CONV Compression rate |
|---|---|---|---|
| VGG-16 | ThiNet | 89.5% | 1.1x |
|  | APoZ | 87.6% | 2.0x |
|  | Our's (pattern + connectivity) | 91.5% | 7.0x |
| ResNet-50 | ThiNet-50 | 90.0% | 2.0x |
|  | ThiNet-30 | 88.3% | 3.3x |
|  | Efficient ConvNet | 91.1% | 1.4x |
|  | Our's (pattern + connectivity) | 92.6% | 3.9x |

FIG. 14

Table 5: PCONV and non-structured pruning comparison on Cifar-10 using VGG-16. We select widely-acknowledged methods - Iterative pruning in (Han et al. 2015) and get the reproduced results from (Liu et al. 2018), and One Shot Pruning results in (Liu et al. 2018).

|  | Method | Top-1 Accuracy | CONV Compression rate |
|---|---|---|---|
| VGG-16 | Iterative Pruning | 93.3% | 3.5x |
|  | One Shot Pruning | 93.7% | 5.0x |
|  | Our's (pattern + connectivity) | 93.8% | 19.7x |
| ResNet-50 | One Shot Pruning | 93.6% | 2.5x |
|  | One Shot Pruning | 92.7% | 3.3x |
|  | Our's (pattern + connectivity) | 95.6% | 11.5x |

FIG. 15

Table 6: PCONV and structured pruning comparison on Cifar-10 using VGG-16 and ResNet-50. We select widely-acknowledged works as our baseline: Efficient ConvNet (Li et al. 2016), 2PFPCE (Min et al. 2018), AMC (He et al. 2018), NISP (Yu et al. 2018), FPGM (He et al. 2019)

|  | Method | Top-1 Accuracy | CONV Compression rate |
|---|---|---|---|
| VGG-16 | 2PFPCE | 92.8% | 4.0x |
|  | Efficient ConvNet | 93.4% | 2.7x |
|  | FPGM | 93.2% | 1.6x |
|  | Our's (pattern + connectivity) | 93.8% | 19.7x |
| ResNet-50 | AMC | 93.5% | 1.7x |
|  | NISP | 93.2% | 1.7x |
|  | Our's (pattern + connectivity) | 95.6% | 11.5x |

FIG. 16

COMPUTER-IMPLEMENTED METHODS AND SYSTEMS FOR DNN WEIGHT PRUNING FOR REAL-TIME EXECUTION ON MOBILE DEVICES

CROSS REFERENCE TO RELATED APPLICATION

This application claims priority from U.S. Provisional Patent Application No. 62/976,613 filed on Feb. 14, 2020 entitled PCONV: The Missing but Desirable Sparsity in DNN Weight Pruning for Real-time Execution on Mobile Devices, which is hereby incorporated by reference.

GOVERNMENT SUPPORT

This invention was made with government support under Grant No. 1739748 awarded by the National Science Foundation. The government has certain rights in the invention.

BACKGROUND

The present application relates generally to compression of deep neural network (DNN) models using weight pruning.

DNNs have emerged as the fundamental element and core enabler in machine learning applications due to their high accuracy, excellent scalability, and self-adaptiveness (Goodfellow et al. 2016). A well trained DNN model can be deployed as an inference system for multiple objectives such as image classification (Krizhevsky, Sutskever, and Hinton 2012), object detection (Ren et al. 2015), and natural language processing (Hinton, Deng, and Yu 2012). However, the state-of-art DNN models such as VGG-16 (Simonyan and Zisserman 2014), ResNet-50 (He et al. 2016) and MobileNet (Howard et al. 2017) involve intensive computation and high memory storage, making it very challenging to execute inference system on current mobile platforms in a real-time manner.

Recently, high-end mobile platforms have rapidly overtaken desktops and laptops as primary computing devices for broad DNN applications such as wearable devices, video streaming, unmanned vehicles, smart health devices, etc. (Philipp, Durr, and Rothermel 2011) (Lane et al. 2015) (Boticki and So 2010). Developing a real-time DNN inference system is desirable but still yield to the limited computation resources of embedded processors on a mobile platform. Multiple end-to-end mobile DNN acceleration frameworks, such as TVM (Chen et al. 2018), TensorFlow-Lite (TFLite) (Ten) and Alibaba Mobile Neural Network (MNN) (Ali), have been developed. However, the inference time of large-scale DNNs (e.g., 242 ms inference time using TVM on Adreno 640 GPU with VGG-16) is still far from real-time requirement.

In order to mitigate the challenges brought by the DNN's bulky computation and achieve the goal of real-time inference, it is necessary to consider algorithm-level innovations. Various DNN model compression techniques are studied, among which weight pruning (Han, Mao, and Dally 2015) (Mao et al. 2017) (Dai, Yin, and Jha 2017) (Wen et al. 2016) (He, Zhang, and Sun 2017) can result in a no-table reduction in the model size. Early work (Han, Mao, and Dally 2015) on non-structured weight pruning (fine-grained) prunes weights at arbitrary location, resulting in a sparse model to be stored in the compressed sparse column (CSC) format. It leads to an undermined processing throughput because the indices in the compressed weight representation cause stall or complex workload on highly parallel architectures (Han, Mao, and Dally 2015) (Wen et al. 2016). On the other hand, structured weight pruning (Wen et al. 2016) (coarse-grained) is more hardware friendly. By exploiting filter pruning and channel pruning, the pruned model is more regular in its shape, which eliminates the storage requirement in weight indices. However, it is observed that structured pruning hurts accuracy more significantly than non-structured sparsity.

It is desirable to find a new granularity level that can satisfy high accuracy demand as well as regularity in DNN model structure. We make the observation that non-structured and structured pruning are two extremes of the full design space. The two missing keys are: (i) Find a new, intermediate sparsity dimension that can fully leverage both the high accuracy from fine-grained models and high regularity level from coarse-grained models; (ii) Find the corresponding (algorithm-compiler-hardware) optimization framework that can seamlessly bridge the gap between hardware efficiency and the new sparsity dimension. To address the above problems, in accordance with one or more embodiments, the present application discloses PCONV, comprising (a) a new sparsity dimension that exploits both intra-convolution and inter-convolution kernel sparsities, exhibiting both high accuracy and regularity, and revealing a previously unknown point in design space; and (b) a compiler-assisted DNN inference framework that fully leverages the new sparsity dimension and achieves real-time DNN acceleration on mobile devices.

In PCONV, we call our intra-convolution kernel pruning pattern pruning and inter-convolution kernel pruning connectivity pruning. For pattern pruning, a fixed number of weights are pruned in each convolution kernel. Different from non-structured weight pruning, pattern pruning produces the same sparsity ratio in each filter and a limited number of pattern shapes. Essentially, our designed patterns correspond to the computer vision concept of key convolution filters, such as Gaussian filter for smoothing, Laplacian of Gaussian for smoothing and sharpening. For connectivity pruning, the key insight is to cut the connections between certain input and output channels, which is equivalent to removal of corresponding kernels, making filter "length" shorter than original model. With connectivity pruning, we further increase the compression rate and provide greater DNN acceleration potential, while maintaining balanced workload in filter-wise computation of DNNs. Pattern and connectivity pruning can be combined at algorithm level and accelerated under the unified compiler-assisted acceleration framework. For our advanced compiler-assisted DNN inference framework, we use execution code generation which converts DNN models into computational graphs and applies multiple optimizations including a high-level, fine-grained DNN layerwise information extraction, filter kernel reorder and load redundancy elimination. All design optimizations are general, and applicable to both mobile CPUs (central processing units) and GPUs (graphics processing units).

We demonstrate that pattern pruning consistently improve model accuracy. When combined with connectivity pruning, the results still outperform current DNN pruning methods, both non-structured and structured weight pruning. In Section "Accuracy Analysis", we show PCONV is the most desirable sparsity among current prune-for-acceleration works. We also deploy PCONV model on our compiler-assisted mobile acceleration framework and compare with three state-of-art frameworks on mobile CPU and GPU, TensorFlow Lite, TVM, and MNN, using three widely used DNNs, VGG-16, ResNet-50, and MobileNet-v2 and two benchmark datasets, ImageNet and CIFAR-10. Evaluation results show that PCONV achieves up to 39.2× speedup without any accuracy drop. Using Adreno 640 embedded GPU, PCONV achieves an unprecedented 19.1 ms inference time of VGG-16 on ImageNet dataset. Real-time execution of such representative large-scale DNNs on mobile devices can be achieved.

BRIEF SUMMARY OF THE DISCLOSURE

In accordance with one or more embodiments, a computer-implemented method is disclosed for compressing a deep neural network (DNN) model by DNN weight pruning to accelerate DNN inference on mobile devices. The method includes the steps of (a) performing an intra-convolution kernel pruning of the DNN model wherein a fixed number of weights are pruned in each convolution kernel of the DNN model to generate sparse convolution patterns; (b) performing inter-convolution kernel pruning of the DNN model to generate connectivity sparsity, wherein inter-convolution kernel pruning comprises cutting connections between given input and output channels of the DNN model to remove corresponding kernels; and (c) training the DNN model compressed in steps (a) and (b).

A computer system in accordance with one or more embodiments includes at least one processor, memory associated with the at least one processor, and a program supported in the memory for compressing a deep neural network (DNN) model by DNN weight pruning to accelerate DNN inference on mobile devices. The program contains a plurality of instructions which, when executed by the at least one processor, cause the at least one processor to: (a) perform an intra-convolution kernel pruning of the DNN model wherein a fixed number of weights are pruned in each convolution kernel of the DNN model to generate sparse convolution patterns; (b) perform inter-convolution kernel pruning of the DNN model to generate connectivity sparsity, wherein inter-convolution kernel pruning comprises cutting connections between given input and output channels of the DNN model to remove corresponding kernels; and (c) train the DNN model compressed in steps (a) and (b).

BRIEF DESCRIPTION OF THE DRAWINGS

FIGS. 10A-10C show visualization of intermediate results in an original VGG-16 baseline model and pattern pruned VGG-16 model through three different methods: (a) visualization of the saliency map of gradient images, (b) visualization of integrated gradients, and (c) visualization of inverted representation in accordance with one or more embodiments.

FIGS. 11-16 show Tables 1-6, respectively.

DETAILED DESCRIPTION

DNN Model Compression

Figure 1:
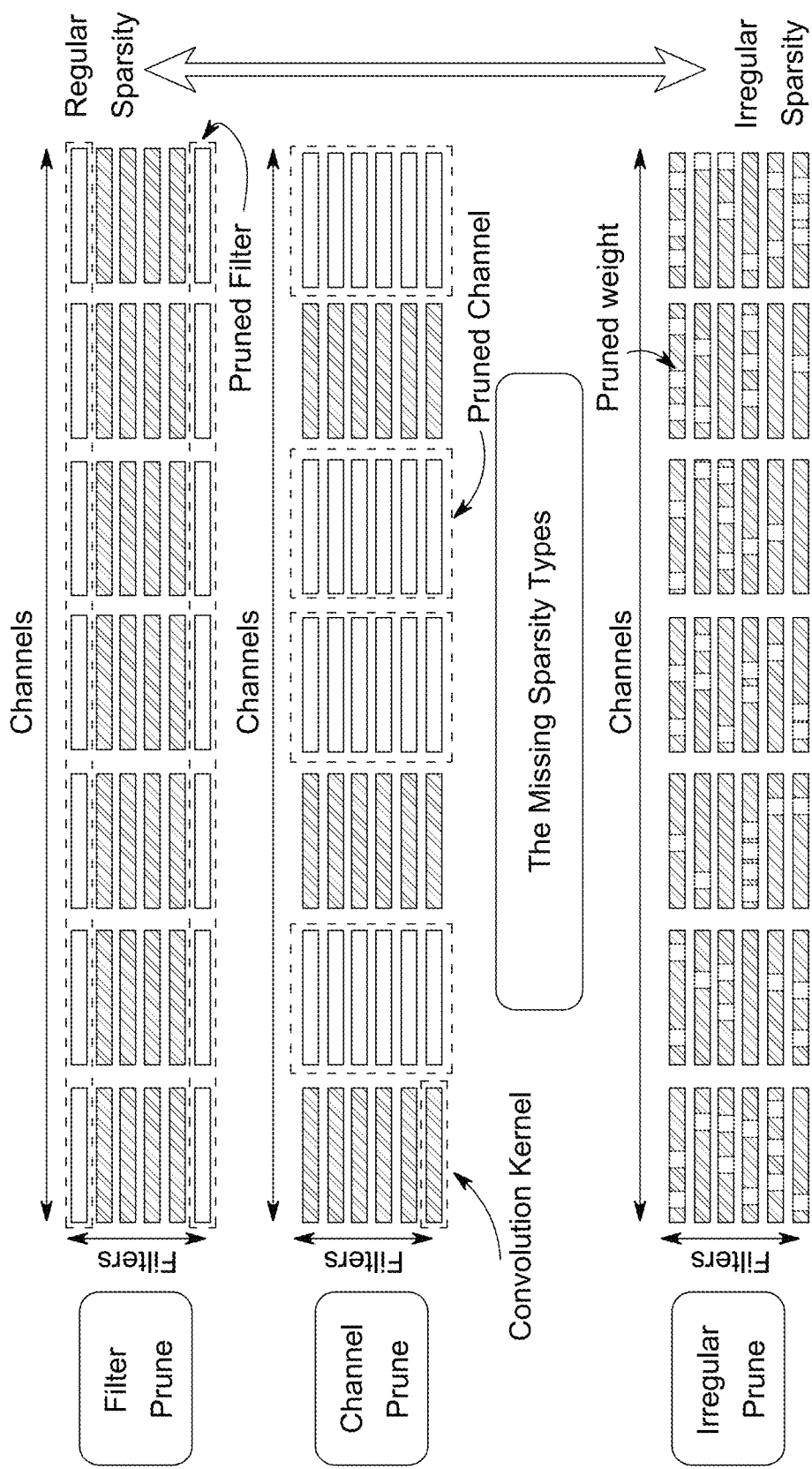
FIG. 1 is a simplified diagram illustrating different weight pruning dimensions.

DNN model compression is a promising way to remove redundancy in the original model. Inference time can be reduced if fewer weights are involved in the computation graph. The weight pruning method removes inherently redundant neurons or synapses. As FIG. 1 shows, two main approaches of weight pruning are the general non-structured pruning and structured pruning, which produce irregular and regular compressed DNN models, respectively.

Non-structured pruning: Early work is (Han, Mao, and Dally 2015), in which an iterative, heuristic method is used with limited, non-uniform model compression rates. Developed by (Zhang et al. 2018) and (Ren et al. 2019) with the powerful ADMM (Boyd et al. 2011) optimization framework, non-structured pruning achieves very high weight reduction rate and promising accuracy. However, for compiler and code optimization, irregular weight distribution within kernels requires heavy control-flow instructions, which degrades instruction-level parallelism. Also, kernels in different filters have divergent workloads, which burdens thread-level parallelism when filters are processed through multithreading. Moreover, irregular memory access causes low memory performance and thereby execution overheads.

Structured pruning: This method has been proposed to address the index overhead and imbalanced workload caused by non-structured pruning. Pioneered by (Wen et al. 2016) (He, Zhang, and Sun 2017), structured weight pruning generates regular and smaller weight matrices, eliminating overhead of weight indices and achieving higher acceleration performance in CPU/GPU executions. However, it suffers from notable accuracy drop when the pruning rate in-creases.

Patterns in Computer Vision

Convolution operations exist in different research areas for an extended period of time, such as image processing, signal processing, probability theory, and computer vision. In this disclosure, we focus on the relationship between conventional image processing and state-of-art convolutional neural networks in the usage of convolutions. In image processing, the convolution operator is manually crafted with prior knowledge from the particular characteristics of diverse patterns such as Gaussian filter. On the other hand, in convolutional neural networks, the convolution kernels are randomly initialized, then trained on large datasets using gradient-based learning algorithms for value updating.

(Mairal et al. 2014) derived a network architecture named Convolutional Kernel Networks (CKN) with lower accuracy than current DNNs, thus having limited usage. (Zhang 2019) proposed applying the blur filter to DNNs before pooling to maintain the shift-equivalence property. The limited prior work on the application of conventional vision filters to DNNs require network structure change and do not focus on weight pruning/acceleration, and is thus distinct from PCONV.

DNN Acceleration Frameworks on Mobile Platforms

Recently, researchers from academia and industry have investigated DNN inference acceleration frameworks on mobile platforms, including TFLite (Ten), TVM (Chen et al. 2018), Alibaba Mobile Neural Network (MNN) (Ali), Deep-Cache (Xu et al. 2018), and DeepSense (Yao et al. 2017). These works do not account for model compression techniques, and the performance is far from real-time requirement. There is other research that exploits model sparsity to accelerate DNN inference, e.g., (Liu et al. 2015), SCNN (Parashar et al. 2017), but they either do not target mobile platforms (require new hardware) or trade off compression rate and accuracy, thus having different challenges than our work.

Based on the current research progress on DNN model compression vs. acceleration, we analyze and rethink the whole design space, and are motivated by the following three points:

Achieving both high model accuracy and pruning regularity. In non-structured pruning, any weight can be pruned. This kind of pruning has the largest flexibility, thus achieves high accuracy and high prune rate. But it is not hardware-friendly. On the other hand, structured pruning produces hardware-friendly models, but the pruning method lacks flexibility and suffers from a drop in accuracy. Our motivation is to use the best of the above two sparsities. To achieve that, we introduce a new dimension, pattern-based sparsity, revealing a previously unknown design point with high accuracy and structural regularity simultaneously.

Image enhancement inspired sparse convolution patterns. The contemporary DNN weight pruning methods originate from the motivation that eliminating redundant information (weights) will not hurt accuracy. On the other hand, these pruning methods scarcely treat pruning as a specific kind of binary convolution operator, not to mention exploiting corresponding opportunities. Along this line, we find that sparse convolution patterns have the potential in enhancing image quality thanks to its special vision properties. Motivated by the fact that sparse convolution patterns can potentially enhance image quality, we propose our carefully designed patterns that are derived from mathematical vision theory.

Compiler-assisted DNN inference framework. With the higher accuracy enabled by fine-grained pruning patterns, the key question is how to regain similar (or even surpass) hardware efficiency as coarse-gained structured pruning. We take a unique approach and design an optimized, compiler-assisted DNN inference framework to close the performance gap between full structured pruning and pattern-based pruning.

Theory of Sparse Convolution Patterns (SCP)

Let an image with resolution H×W be represented by $X \in R^{H \times W \times 3}$. An L-layer DNN can be expressed as a feature extractor FL (FL-1( ... Fl(X) ... )), with layer index $l \in \{1, \ldots, L\}$. Inside the DNN, each convolutional layer is defined as $Fl(Xl) \in R^{Hl \times Wl \times Fl \times Cl}$, with filter kernel shape Hl×Wl, number of filters Fl and number of channels Cl.

Figure 2:
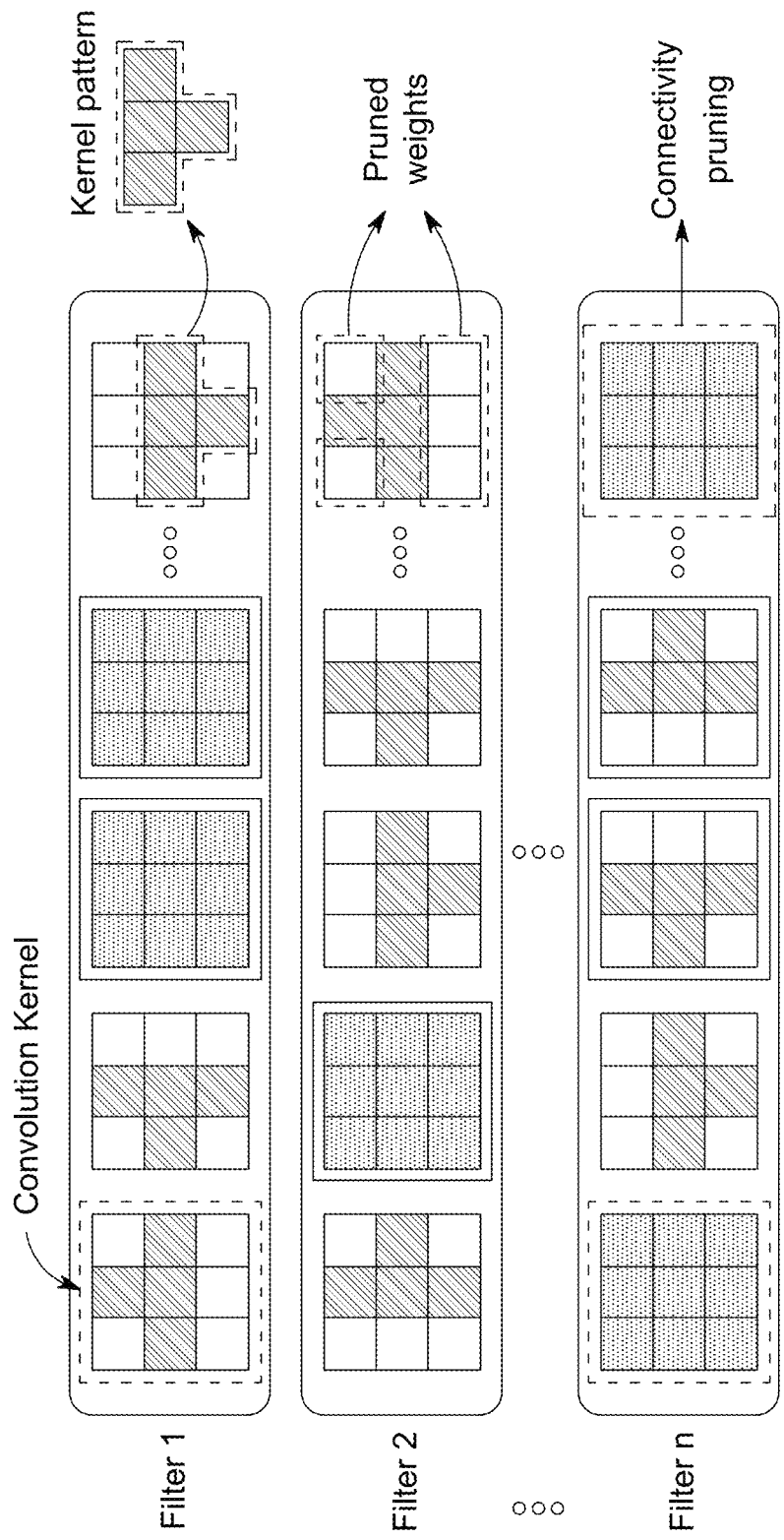
FIG. 2 is a simplified diagram illustrating pattern pruning and connectivity pruning in accordance with one or more embodiments.

Besides treating pruning as a redundant information removal technique, we consider it as incorporating an additional convolution kernel P to perform element-wise multiplication with the original kernel. P is termed the Sparse Convolution Pattern (SCP), with dimension Hl×Wl and binary-valued elements (0 and 1). Specific SCPs fit the mathematical vision theory well according to our following derivation. Based on the mathematical rigor, we propose the novel pattern pruning scheme, i.e., applying SCPs to convolution kernels. As illustrated in FIG. 2, the white blocks denote a fixed number of pruned weights in each kernel. The remaining red blocks in each kernel have arbitrary weight values, while their locations form a specific SCP Pi. Different kernels can have different SCPs, but the total number of SCP types is limited.

In order to further increase the pruning ratio and DNN inference speed, we can selectively cut the connections between particular input and output channels, which is equivalent to the removal of corresponding kernels. This is termed connectivity pruning. Connectivity pruning is illustrated in FIG. 2, with gray kernels as pruned ones. The rationale of connectivity pruning stems from the desirability of locality in layerwise computations inspired by human visual systems (Yamins and DiCarlo 2016). It is a good supplement to pattern pruning. Both pruning schemes can be integrated in the same algorithm-level solution and compiler-assisted mobile acceleration framework.

The Convolution Operator

In conventional image processing, a convolution operator is formally defined by the following formula, where the output pixel value g(x, y) is the weighted sum of input pixel values f(x, y), and h(k, l) is the weight kernel value $$q(x, y) = \sum_{k,l} f(x+k, y+l) h(k, l) \qquad (1)$$

This formula could transform to $$g(x, y) = \sum_{k,l} f(k, l) h(x-k, y-l) \qquad (2)$$

Then we derive the notation of convolution operator as:
$$g = f * h \qquad (3)$$

Convolution is a linear shift-invariant (LSI) operator, satisfying the commutative property, the superposition property, and the shift-invariance property. Additionally, convolution satisfies the associative property following the Fubini's theorem.

Sparse Convolution Pattern (SCP) Design

Our designed SCPs could be transformed to a series of steerable filters (Freeman and Adelson 1991), i.e., the Gaussian filter and Laplacian of Gaussian filter, which function as image smoothing, edge detection or image sharpening in mathematical vision theory.

Gaussian filter: Consider a two-dimensional Gaussian filter G:

$$G(x, y, \sigma) = \frac{1}{2\pi\sigma^2} e^{-\frac{x^2+y^2}{2\sigma^2}} \qquad (4)$$

x and y are input coordinates, and σ is standard deviation of the Gaussian distribution. Typically, the Gaussian filter performs image smoothing, and further sophisticated filters can be created by first smoothing the image input with a unit area Gaussian filter, then applying other steerable filters.

Laplacian of Gaussian filter: The Laplacian operator is the second derivative operator. According to the associative property, smoothing an image with Gaussian filter and then applying Laplacian operator is equivalent to convolve the image with the Laplacian of Gaussian (LoG) filter:

$$\nabla^2 G(x, y, \sigma) = \left(\frac{x^2 + y^2}{\sigma^4} - \frac{2}{\sigma^2}\right) G(x, y, \sigma) \quad (5)$$

The LoG filter is a bandpass filter that eliminates both the high-frequency and low-frequency noises. LoG has elegant mathematical properties, and is valid for a variety of applications including image enhancement, edge detection, and stereo matching.

Taylor series expansion is utilized to determine the approximate values of the LoG filter with 3×3 filter size. First, we consider the 1-D situation. The Taylor series expansions of 1-D Gaussian filter G(x) are given by:

$$G(x + h) = G(x) + hG'(x) + \frac{1}{2}h^2 G''(x) + \frac{1}{3!}h^3 G'''(x) + O(h^4) \quad (6)$$

$$G(x - h) = G(x) - hG'(x) + \frac{1}{2}h^2 G''(x) - \frac{1}{3!}h^3 G'''(x) + O(h^4) \quad (7)$$

By summing (6) and (7), we have $$G(x+h)+G(x-h)=2G(x)+h^2 G''(z)+O(h^4) \quad (8)$$

The second derivative of Gaussian $G00(x)$ is equivalent to LoG $\nabla^2 G(x)$. Equation (8) is further transformed to $$\frac{G(x - h) - 2G(x) + G(x + h)}{h^2} = \nabla^2 G(x) + O(h^2) \quad (9)$$

Applying central difference approximation of LoG $\nabla^2 G(x)$, we derive the 1-D approximation of LoG filter as [1 −2 1]. Then we procure the 2-D approximation of LoG filter by convolving [1 −2 1] and $$\begin{bmatrix} 1 \\ -2 \\ 1 \end{bmatrix},$$

and get result as $$\begin{bmatrix} -1 & 2 & -1 \\ 2 & -4 & 2 \\ -1 & 2 & -1 \end{bmatrix}.$$

According to the property of second derivative:

$$\nabla^2 G(x,y) = G_{xx}(x,y) + G u_{yy}(x,y) \quad (10)$$

and Equation (9), we have $$G_{xx}(x, y) + G_{yy}(x, y) = \left([1 \ -2 \ 1] + \begin{bmatrix} 1 \\ -2 \\ 1 \end{bmatrix}\right) * G(x, y) \quad (11)$$

Based on (11), we derive another approximation of LoG as $$\begin{bmatrix} 0 & 1 & 0 \\ 1 & -4 & 1 \\ 0 & 1 & 0 \end{bmatrix}.$$

According to the central limit theorem, the convolution of two Gaussian functions is still a Gaussian function, and the new variance is the sum of the variances of the two original Gaussian functions. Hence, we convolve the above two approximations of LoG and then apply normalization, and get the Enhanced Laplacian of Gaussian (ELOG) filter as $$\begin{bmatrix} 0 & 1 & 0 \\ 1 & 8 & 1 \\ 0 & 1 & 0 \end{bmatrix}.$$

(Siyuan, Raef, and Mikhail 2018) have proved the convergence of the interpolation in the context of (multi-layer) DNNs, so we utilize the interpolated probability density estimation to make the further approximation. In ELOG filter where 1 appears, we mask it to 0 with the probability of (1−p). Because we uniformly convolve SCPs into n convolutional layers, this random masking operation can be treated as distributed interpolation of SCPs. In continuous probability space, interpolating SCPs into convolution function is a specific Probability Density Function (PDF), so the effect of interpolating SCPs is accumulating probability expectations of interpolation into n convolutional layers. Besides, the convolution function is normalized to unity, so we separate the coefficient p in the following equation.

$$\underbrace{\begin{bmatrix} 0 & 1 & 0 \\ 1 & 1 & 1 \\ 0 & 0 & 0 \end{bmatrix} \ldots \begin{bmatrix} 0 & 1 & 0 \\ 1 & 1 & 0 \\ 0 & 1 & 0 \end{bmatrix} \ldots \begin{bmatrix} 0 & 0 & 0 \\ 1 & 1 & 1 \\ 0 & 1 & 0 \end{bmatrix} \ldots \begin{bmatrix} 0 & 1 & 0 \\ 0 & 1 & 1 \\ 0 & 1 & 0 \end{bmatrix}}_{n\ interpolations} = \quad (12)$$

$$\begin{bmatrix} 0 & p & 0 \\ p & 1 & p \\ 0 & p & 0 \end{bmatrix} = \left(p \begin{bmatrix} 0 & 1 & 0 \\ 1 & 1/p & 1 \\ 0 & 1 & 0 \end{bmatrix}\right)^n$$

The four SCPs are shown in colored positions in (12). In order to get the best approximation to ELOG filter, we set p=0.75 and n=8, then the desired filter is equal to interpolating these four SCPs for eight times. The coefficient p has no effect after normalization.

Upper bound: According to (C. Blakemore and Campbell 1969), the optimal times for applying the LoG filter is six and the maximum is ten. Thus the desired number of times to interpolate the SCP in (12) is around 24 and the maximum number is around 55. This upper bound covers most of the existing effective DNNs, even for ResNet-152, which comprises 50 convolutional layers with filter kernel size of 3×3.

The four SCPs in (12) form the ELOG filter through interpolation. Hence, the designed SCPs inherit the denoising and sharpening characteristics of LoG filters. We visualize the intermediate results of DNNs to interpret and verify the advancement of our designed SCPs in the following section.

Visualization and Interpretation

Figure 3:
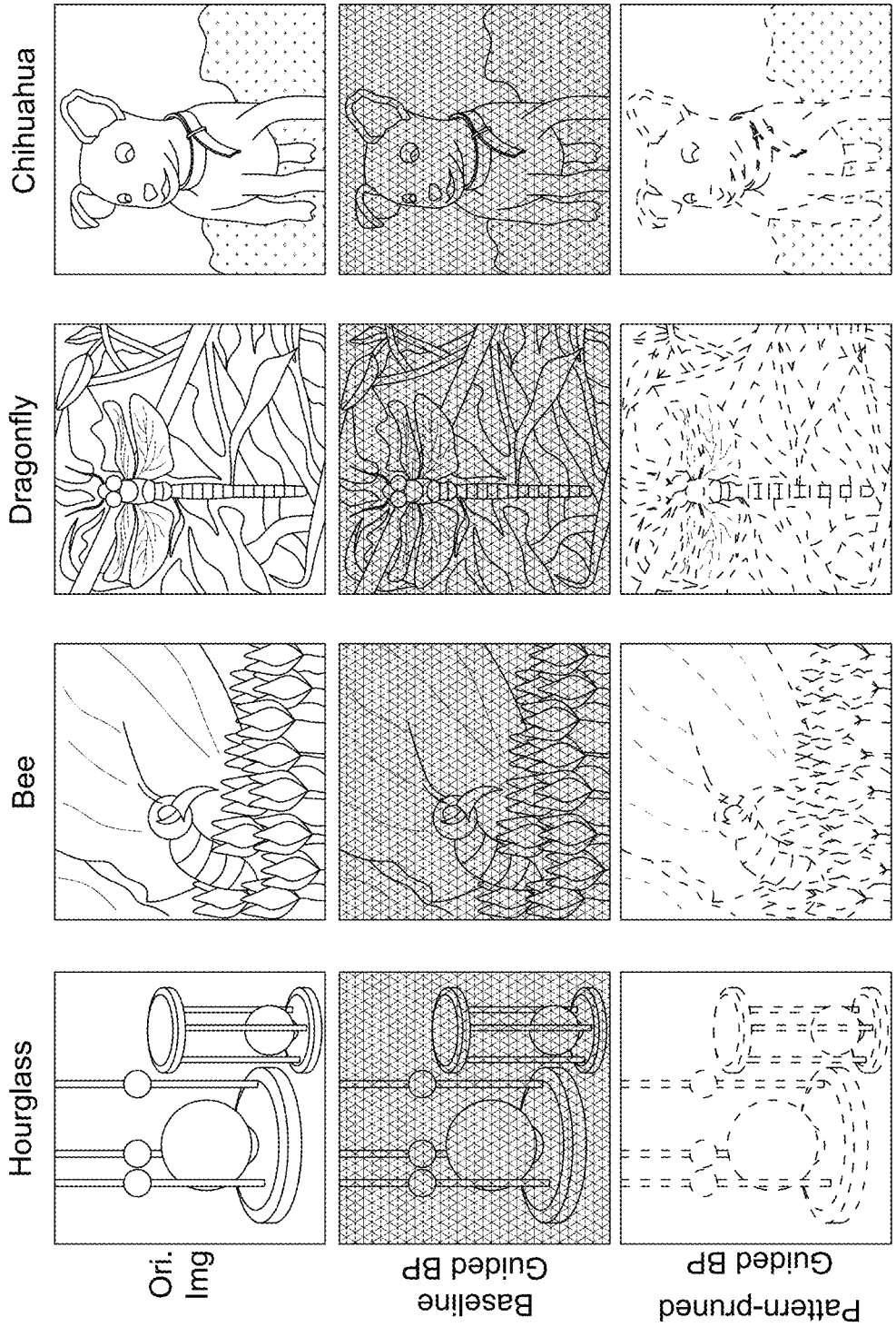
FIG. 3 shows a visualization of intermediate results (saliency map of gradient images) in an original VGG-16 model and a pattern pruned VGG-16 model through guided-backpropagation in accordance with one or more embodiments.

Explanations of individual DNN decisions have been explored by generating informative heatmaps such as CAM and grad-CAM (Selvaraju et al. 2017), or through guided-backpropagation (BP) (Springenberg and Alexey Dosovitskiy 2015) conditioned on the final prediction. Utilizing guided-backpropagation, we can visualize what a DNN has learned. The visualization results of applying SCPs to an original DNN model (pattern pruning) are demonstrated in FIG. 3. We sample four input images from the ImageNet dataset, as "hourglass", "bee", "dragonfly" and "chihuahua", then apply the guided-backpropagation to propagate back from each target class label and get the gradient images. Eventually, we generate the saliency maps of gradient images. Compared with the original VGG-16 model, the pattern pruned VGG-16 model captures more detailed information of the input image with less noise.

There are plenty of DNN visualization techniques. In Supplemental Materials, we demonstrate two more sets of visualization results using integrated gradients and inverted representation methods. And both sets show, our pattern pruned model collects more information in an image than the original model. We conclude that by applying our designed SCPs, pattern pruning enhances DNNs' image processing ability.

Accuracy Analysis

In our previous derivation, we have determined the (four) SCPs as our pattern set. Our algorithm-level solution starts from a pre-trained DNN model, or can train from scratch. To generate PCONV model, we need to assign SCPs to each kernel (pattern pruning) or prune specific kernels (connectivity pruning), and train the active (unpruned) weights. To achieve this goal, we extend the ADMM-NN framework in (Ren et al. 2019) to produce pattern and connectivity-pruned models. The algorithm details in PCONV model generation are described further below.

Figure 4:
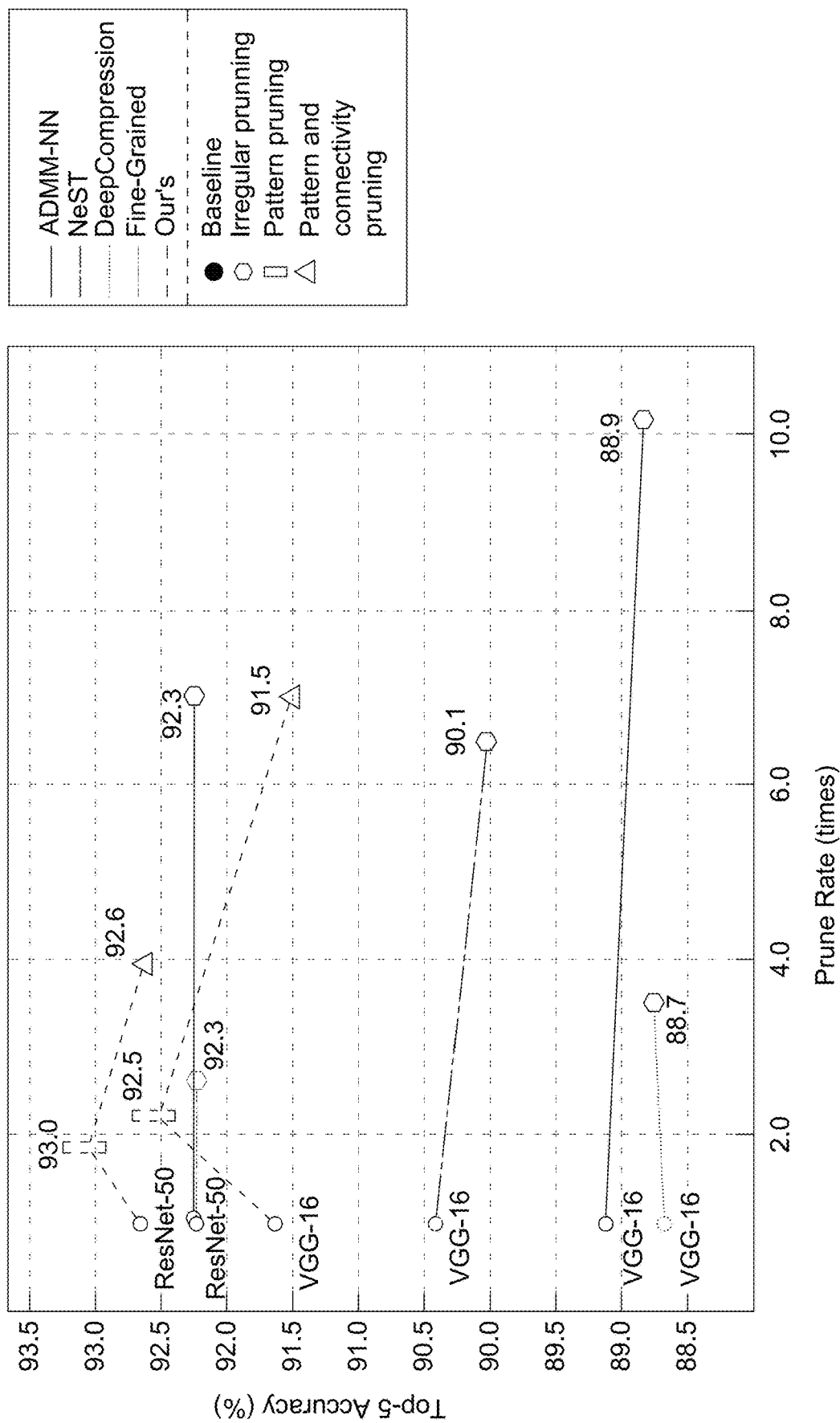
FIG. 4 is a graph showing comparison results of pattern and connectivity pruning of VGG-16 and ResNet-50 on ImageNet dataset with ADMM-NN, NeST, Deep Compression, and Fine-grained pruning.
Figure 5:
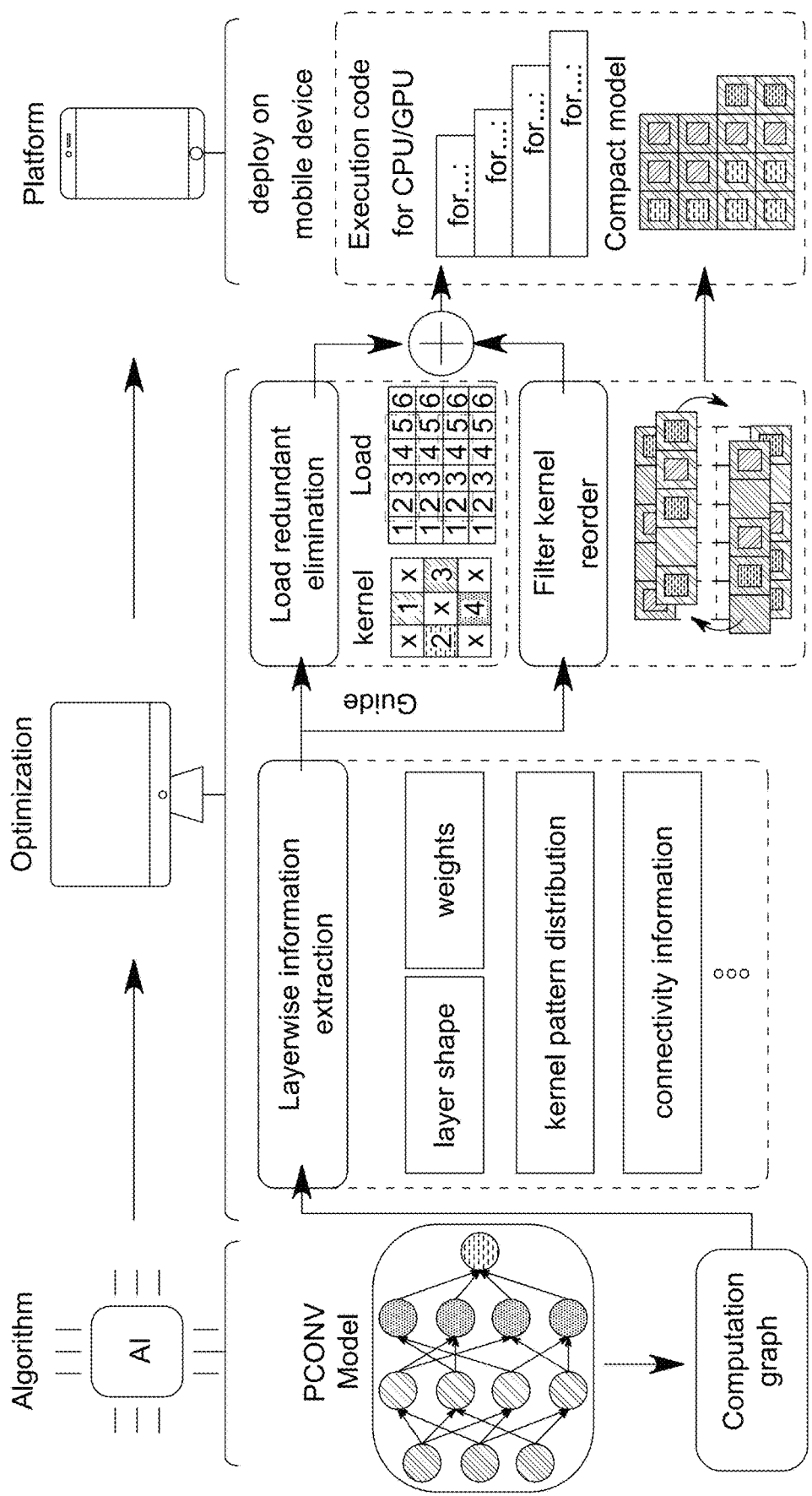
FIG. 5 is a simplified diagram showing an overview of a PCONV acceleration framework in accordance with one or more embodiments, from algorithm-level design to platform-level implementation.

Accuracy results are illustrated in FIG. 4. Starting from the baseline accuracy results that are in many cases higher than prior work, we have the first conclusion that the accuracy will improve when applying our designed SCPs on each convolution kernel. For ImageNet dataset, pattern pruning improves the top-5 accuracy of VGG-16 from 91.7% to 92.5%, and ResNet-50 from 92.7% to 93.0% with SCPs applied to each convolution kernel. The accuracy improvement is attributed to the enhanced image processing ability of our designed SCPs.

Pruning vs. accuracy for non-structured pruning, structured pruning and PCONV. Combined with connectivity pruning, PCONV achieves higher compression rate without accuracy compromise. Comparing with other pruning methods, i.e., non-structured pruning and structured pruning, we conclude that: (i) PCONV achieves higher accuracy and higher compression rate compared with prior non-structured pruning, and close to the results in ADMM-NN; (ii) compared with structured pruning, under the same compression rate, PCONV achieves higher accuracy, and can structurally prune more weights without hurting accuracy. Detailed comparison is shown in Supplemental Materials.

Compiler-Assisted DNN Inference Framework

In this section, we propose our novel compiler-assisted DNN inference acceleration framework for mobile devices. Motivated by the two merits-flexibility and regularity of the PCONV model, our compiler-assisted platform uniquely enables optimized code generation to guarantee end-to-end execution efficiency. As DNN's computation paradigm is in a manner of layerwise execution, we can convert a DNN model into computational graph, which is embodied by static C++ (for CPU execution) or OpenCL (for GPU execution) code. The code generation process includes three steps: (i) layerwise information extraction; (ii) filter kernel reorder; (iii) load redundancy elimination.

Layerwise information extraction is a model analysis procedure. In particular, it analyzes detailed kernel pattern and connectivity-related information. Key information such as pattern distribution, pattern order and connection between input/output channel through kernels are utilized by the compiler to perform optimizations in steps (ii) and (iii).

Figure 6:
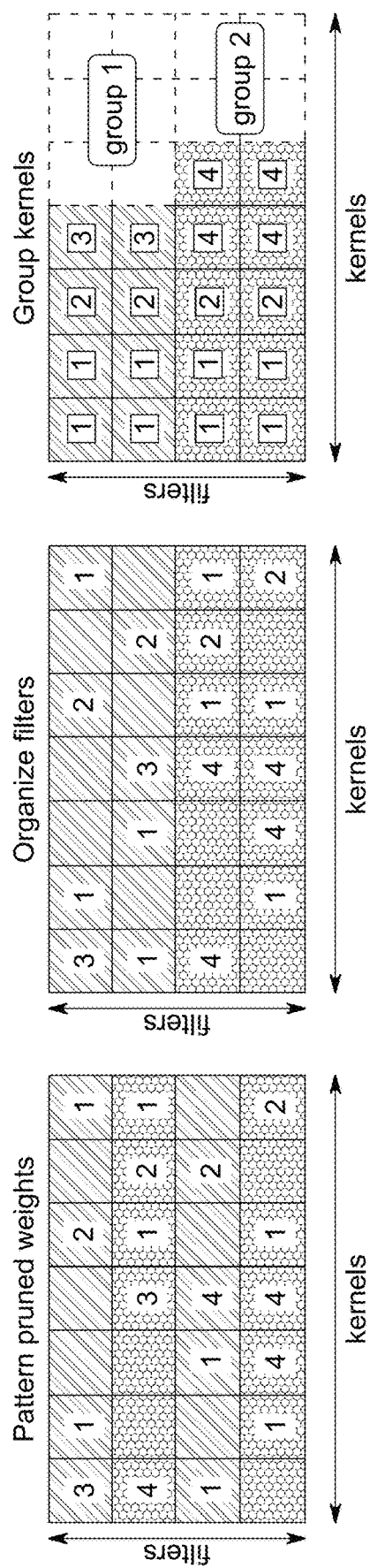
FIG. 6 is a simplified diagram showing steps of filter kernel reorder in accordance with one or more embodiments, where each square represents a convolution kernel, and the number represents the specific pattern type of this kernel.

Filter kernel reorder is designed to achieve the best of instruction-level and thread-level parallelism. When a PCONV model is trained, patterns and connections of all kernels are already known, i.e., the computation pattern is already fixed before deploying the model for inference. All these information of patterns are collected from layerwise information extraction, and is leveraged by filter kernel re-order to (i) organize the filters with similar kernels together to improve inter-thread parallelism, and (ii) order the same kernels in a filter together to improve intra-thread parallelism. FIG. 6 illustrates the two key steps of filter kernel reorder: (i) organizes similar filters next to each other; (ii) groups kernels with identical patterns in each filter together. As a result, the generated execution code eliminates much of execution branches, implying higher instruction-level parallelism; meanwhile, similar filter groups escalate execution similarity and result in a good load balance, achieving better thread-level parallelism.

Load redundancy elimination addresses the issue of irregular memory access that causes memory overhead. In DNN execution, the data access pattern of input/output is decided by the (none-zero elements) patterns of kernels. Therefore, we can generate data access code with this information for each kernel pattern and call them dynamically during DNN execution. Because the data access code consists of all information at kernel-level computation, it is possible to directly access valid input data that is associated with the non-zero elements in a pattern-based kernel. After steps (i) and (ii), patterns are distributed in a structured manner, which reduces the calling frequency of data access code and as a result, reduces the memory overhead.

Experimental Results

In this section, we evaluate the execution performance of our compiler-assisted framework with our PCONV model deployed. All of our evaluation models are generated by ADMM pruning algorithm which is described further below, and are trained on an eight NVIDIA RTX-2080Ti GPUs server using PyTorch.

Methodology

In order to show acceleration of PCONV on mobile devices, we compare it with three state-of-art DNN inference acceleration frameworks, TFLite (Ten), TVM (Chen et al. 2018), and MNN (Ali). Our experiments are conducted on a Samsung Galaxy S10 cell phone with the latest Qualcomm Snapdragon 855 mobile platform that consists of a Qualcomm Kryo 485 Octa-core CPU and a Qualcomm Adreno 640 GPU.

In our experiment, our generated PCONV models are based on three widely used network structures, VGG-16 (Simonyan and Zisserman 2014), ResNet-50 (He et al. 2016) and MobileNet-v2 (Howard et al. 2017). Since convolution operation is most time-consuming (more than 95% of the total inference time) in DNN computation, our evaluation on the above network structures focus on convolutional layers performance. In order to provide a very clear illustration on how PCONV enhances mobile performance, the whole device-level evaluation is shown in three aspects: (i) execution time, (ii) on-device GFLOPS performance and (iii) how pattern counts affect performance.

Performance Evaluation

In this section, we demonstrate our evaluation results on mobile device from the three aspects we discussed above. In order to illustrate PCONV has the best acceleration performance on mobile devices, our comparison baselines, i.e., TFLite, TVM and MNN use the fully optimized configurations (e.g., Winograd optimization is turned on).

Figure 7:
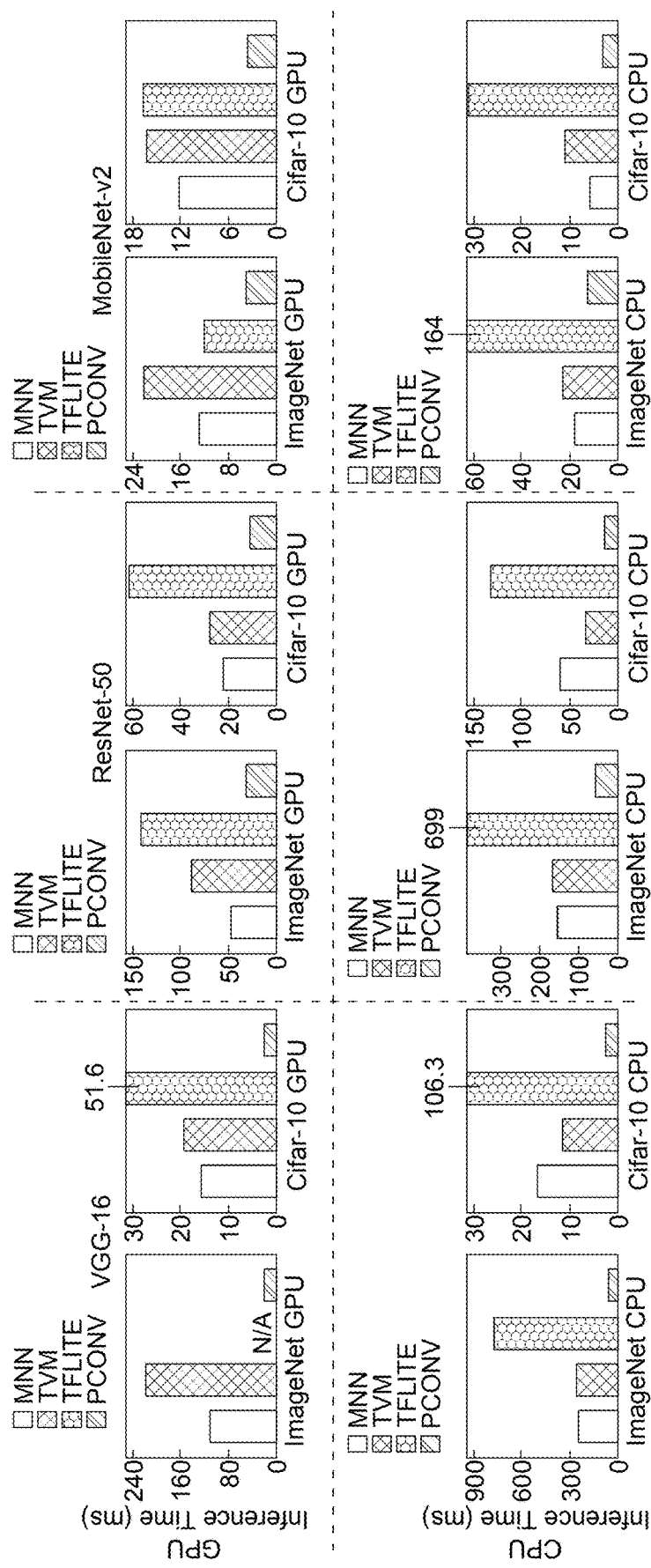
FIG. 7 is a set of graphs showing mobile CPU/GPU performance of a PCONV model executing on a compiler-assisted DNN inference framework in accordance with one or more embodiments.

Execution time. FIG. 7 shows mobile CPU/GPU performance of PCONV model executing on our compiler-assisted DNN inference framework. On CPU, PCONV achieves 9.4× to 39.2× speedup over TFLite, 2.2× to 5.1× speedup over TVM and 1.7× to 6.3× speedup over MNN. On GPU, PCONV achieves 2.2× to 18.0× speedup over TFLite, 2.5× to 11.4× speedup over TVM and 1.5× to 5.8× speedup over MNN. For the largest DNN (VGG-16) and largest data set (ImageNet), our framework completes computations on a single input image within 19.1 ms (i.e., 52.4 frames/sec) on GPU, which meets the real-time requirement (usually 30 frames/see, i.e., 33 ms/frame).

Figure 8:
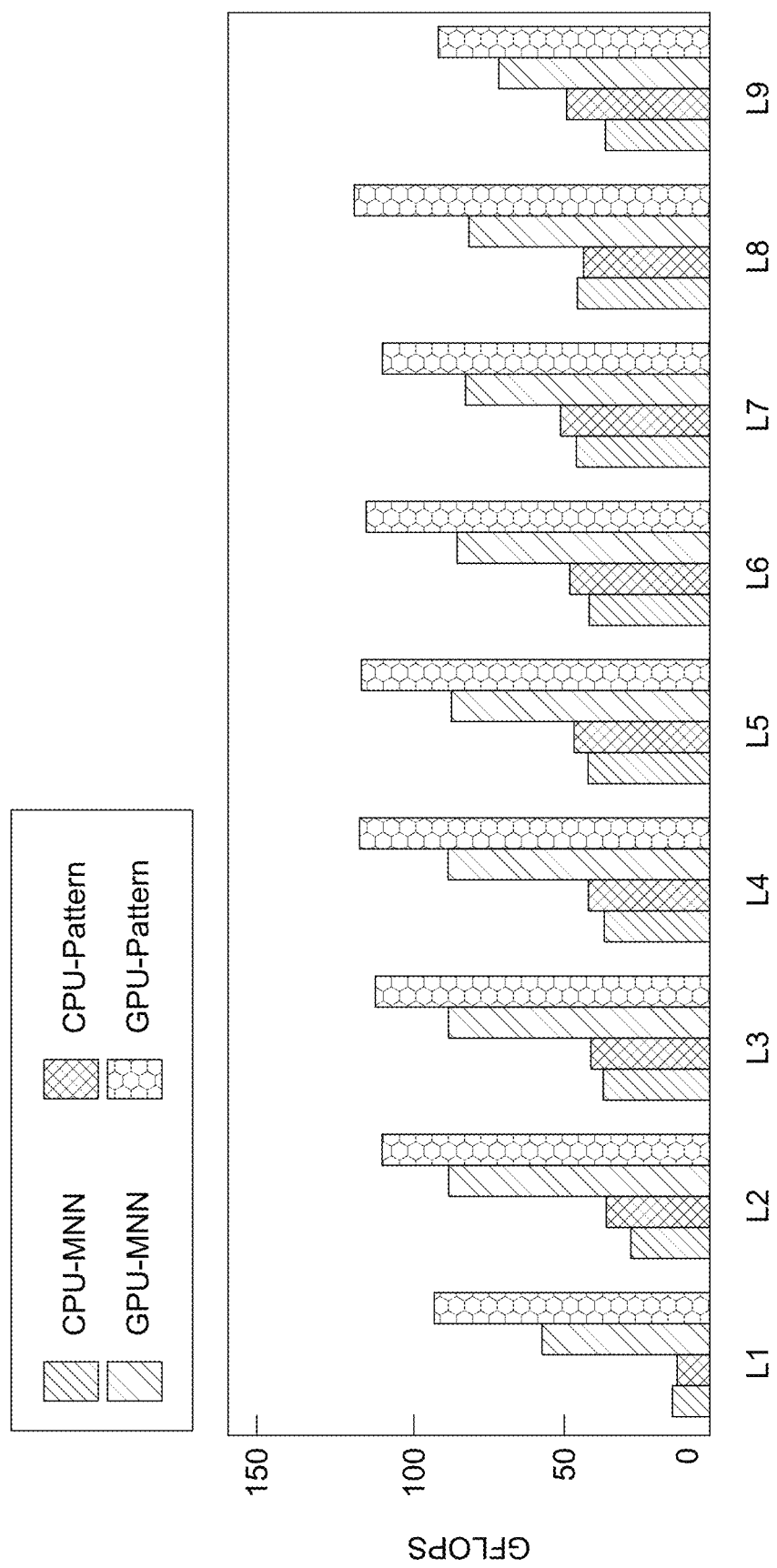
FIG. 8 is a graph showing an on-device GFLOPS performance evaluation of MNN and PCONV in accordance with one or more embodiments.

On-device GFLOPS performance. From the previous comparison results we see that MNN has the higher performance than TVM and TFLite. To show that PCONV has better throughput on mobile devices, we compare PCONV with MNN by measuring their run-time GFLOPS on both CPU and GPU. FIG. 8 demonstrates layerwise GFLOPS performance comparison between PCONV and MNN. The 9 layers we pick from VGG-16's 13 convolutional layers are representing 9 unique layers with 9 unique layer sizes. The other 4 layers are omitted in FIG. 8 because they have repeated layer sizes which product repeated GFLOPS results. From the results we can see that for both CPU and GPU throughputs, PCONV outperforms MNN.

Pattern counts vs. performance. In order to determine how pattern counts affects execution performance, we design some random patterns with 4 non-zero elements in one kernel alongside with our designed SCPs. Table 1 and Table 2 show accuracy and execution time under different pattern counts using VGG-16 on Cifar-10 and ImageNet datasets. The results show that the accuracy losses are not necessarily related to the increase of pattern counts, but the execution performance drops quickly, especially on ImageNet dataset. The pattern counts vs. performance results prove that our designed SCPs result in ideal performance with a negligible accuracy loss.

Pattern and Connectivity Pruning Algorithm

Figure 9:
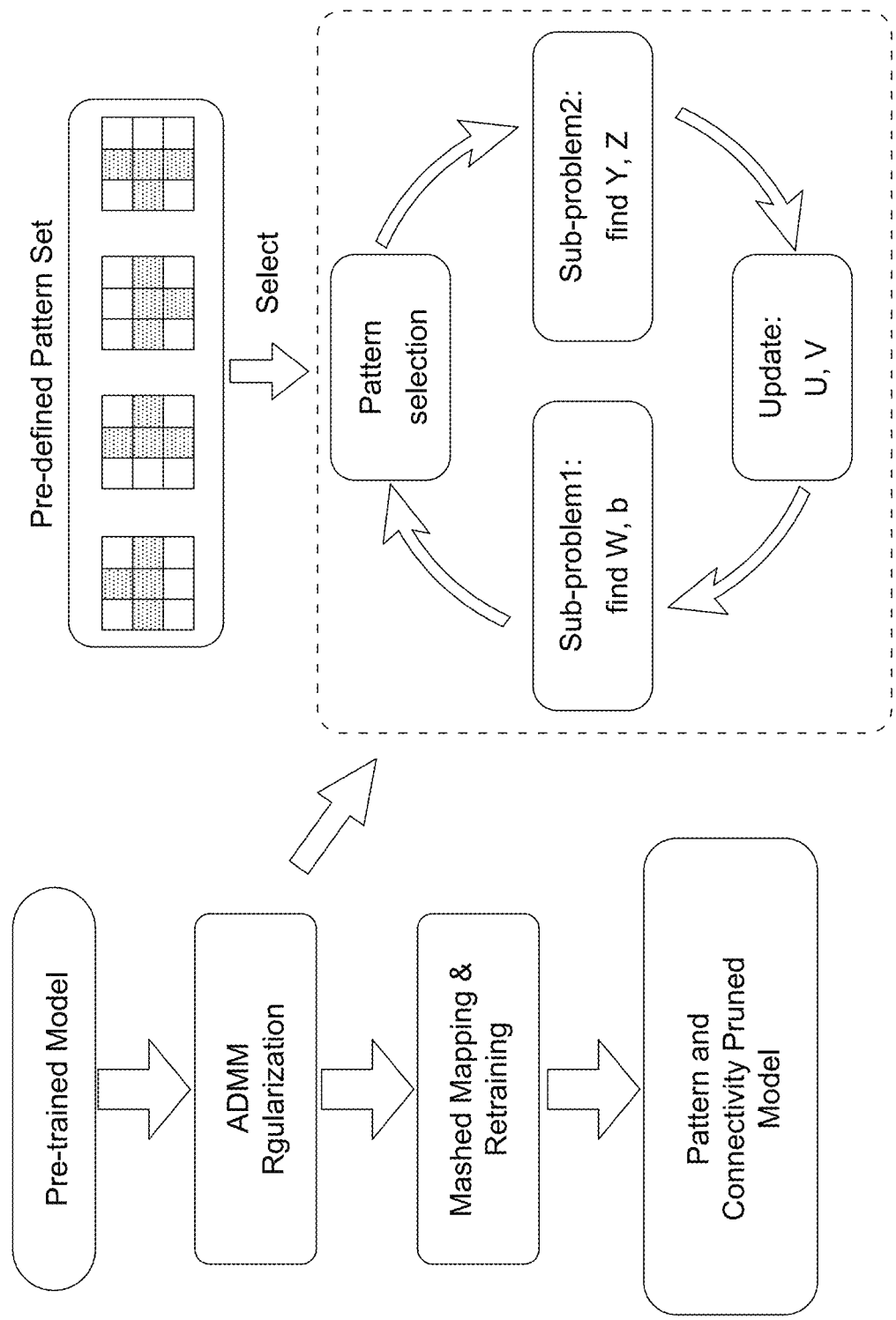
FIG. 9 is a simplified diagram showing an algorithm-level overview of ADMM pattern regularization in accordance with one or more embodiments.

From our derivation in Section "Theory of Sparse Convolution Patterns (SCP)", we have determined the (four) SCPs as our desired patterns. In this section, we describes the methods to generate compressed DNN models for PCONV. The procedure is composed of two steps: (1) we use the four SCPs to form a pattern set; (2) assign a pattern from pattern set for each kernel (pattern pruning) or prune the whole kernel (connectivity pruning), and train the pattern-based weights for maintaining accuracy. The overall flow is shown in FIG. 9. Essentially, it reflects the algorithm aspects of PCONV. Our method can be applied to either a pre-trained DNN or train a model from scratch.

Problem Formulation: Consider an N-layer DNN, and we focus on the most computationally intensive CONV layers. The weights and biases of layer k are respectively denoted by Wk and bk, and the loss function of DNN is denoted by $$f(\{W_{kk}\}_{k=1}^N, \{b_k\}_{k=1}^N);$$

see (Zhang et al. 2018). In our discussion, $$\{W_k\}_{k=1}^N \text{ and } \{b_k\}_{k=1}^N$$

respectively characterize the collection of weights and biases from layer 1 to layer N. Then the pattern and connectivity pruning is formulated as an optimization problem:

$$\underset{\{W_k\},\{b_k\}}{\text{minimize}} \quad f(\{W_k\}_{kk=1}^N \{b_k\}_{k=1}^N), \qquad (12)$$

$$\text{subject to} \quad W_k \in S_k, W_k \in S'_k, k = 1, \ldots, N.$$

The collection of weights in the k-th CONV layer forms a four-dimensional tensor, i.e., $W_k \in \mathbb{R}^{P_k \times Q_k \times C_k \times C_{k+1}}$, where Pk, Qk, Ck, and Ck+1 are respectively the height of kernel, the width of kernel, the number of kernels, and the number of filters, in layer k. Suppose X denotes the weight tensor in a specific layer, then (X):,:,a,b denotes a specific kernel.

In pattern pruning, the constraint in the k-th CONV layer is $W_k \in S_k := \{X|$ each kernel in X needs to satisfy one specific pattern shape in the pattern set (and non-zero weight values can be arbitrary)}. In connectivity pruning, the constraint in the k-th CONV layer is $W_k \in S'_k := \{X|$ the number of nonzero kernels in X is less than or equal to αk} (αk is a predetermined hyperparameter with more discussions later). Both constraints need to be simultaneously satisfied.

Extended ADMM-based Solution Framework: The constraint $W_k \in S_k$ in problem (12) is different from the clustering-like constraints in ADMM-NN (Ren et al. 2019), in that it is flexible to select a pattern for each kernel from the pattern set. As long as a pattern is assigned for each kernel, constraints in problem (12) become clustering-like and ADMM compatible. Similar to ADMM-NN (Ren et al. 2019), the ADMM-based solution is an iterative process, starting from a pre-trained DNN model. We assign an appropriate pattern for each kernel based on the L2-norm metric in each iteration, to achieve higher flexibility.

By incorporating auxiliary variables Zk's and Yk's, and dual variables Uk's and Vk's, we decompose (12) into three iteration 1, after assigning patterns we solve the first subproblem $$\underset{\{W_k\},\{b_k\}}{\text{minimize}} \quad f(\{W_k\}_{kk=1}^N \{b_k\}_{k=1}^N) + \qquad (13)$$

$$\sum_{k=1}^N \frac{\rho_k}{2} \|W_k - Z_k^t + U_k^t\|_F^2 + \sum_{k=1}^N \frac{\rho_k}{2} \|W_k - Y_k^t + V_k^t\|_F^2.$$

The first term is the loss function of the DNN, while the other quadratic terms are convex. As a result, this subproblem can be solved by stochastic gradient descent (e.g., the ADAM algorithm (Kingma and Ba 2014)) similar to training the original DNN.

The solution {Wk} of subproblem 1 is denoted by $\{W^{l+1}{}_k\}$. Then we aim to derive $\{Z^{l+1}{}_k\}$ and $\{Y^{l+1}{}_k\}$ in sub-problems 2 and 3. These subproblems have the same form as those in ADMM-NN (Ren et al. 2019). Thanks to the characteristics in combinatorial constraints, the optimal, analytical solution of the two subproblems are Euclidean projections, and are polynomial time solvable. For example, for connectivity pruning, the projection is: keeping ak kernels with largest L2 norms and setting the rest of kernels to zero. For pattern pruning it is similar. Finally, we update dual variables Uk and Vk according to the ADMM rule (Boyd et al. 2011) and thereby complete the 1-th iteration in the ADMM-based solution.

The hyperparameter determination process is relatively straightforward for joint pattern and connectivity pruning. There is no additional hyperparameters for pattern pruning when the pattern set has been developed. For connectivity pruning we need to determine the pruning rate ak for each layer. In this paper, we adopt a heuristic method of uniform pruning rate for all layers except for the first layer (which is smaller, yet more sensitive to pruning).

Accuracy Evaluation for Different Pruning Methods

In this section, we provide comparison results on accuracy and compression rate of PCONV and several baseline works. Based on two different datasets, we category our comparison into two parts-one for ImageNet compression results and another one for Cifar-10. In both categories, we compare PCONV with prior works in non-structured pruning and structured pruning. The comparison results show that (i) PCONV achieves higher accuracy and higher compression rate compared with prior non-structured pruning, and close to the results in ADMM-NN; (ii) compared with structured pruning, under the same compression rate, PCONV achieves higher accuracy, and can structurally prune more weights without hurting accuracy.

ImageNet Dataset

Table 3 and Table 4 illustrate the Top-5 accuracy comparison on joint pattern pruning and connectivity pruning, on VGG-16 and ResNet-50 using ImageNet dataset. For VGG-16, all kernels are 3×3. After applying SCPs on all kernels and 3.1× uniform connectivity pruning, we achieve around 7× weight reduction on convolution layers of VGG-16. For ResNet-50, a portion of kernels are 1×1 besides the majority of 3×3 kernels. We apply pattern pruning on all 3×3 ones, and apply uniform 2.7× connectivity pruning on all kernels. We achieve 3.9× weight reduction on convolution layers.

Cifar-10 Dataset

Table 5 and Table 6 illustrate the Top-1 accuracy comparison on joint pattern pruning and connectivity pruning, on VGG-16 and ResNet-50 using Cifar-10 dataset. For VGG-16, all kernels are 3×3. After applying SCPs on all kernels and 8.8× uniform connectivity pruning, we achieve around 19.7× weight reduction on convolution layers of VGG-16. For ResNet-50, a portion of kernels are 1×1 besides the majority of 3×3 kernels. We apply pattern pruning on all 3×3 ones, and apply uniform 8× connectivity pruning on all kernels. We achieve 11.5× weight reduction on convolution layers.

Visualization Interpretation for Verification

As discussed above, by adopting guided-backpropagation technique, we generate one set of visualization results of four images from ImageNet dataset to demonstrate the image enhancement ability of PCONV. In this section, we extend the visualization results by adopting two more widely used visualization methods, integrated gradients (Mukund, Ankur, and Qiqi 2017) and inverted representation (Aravindh and Andrea 2015). By using three visualization techniques, we provide strong evidence that PCONV can effectively capture more image details.

Integrated gradients attribute a complex DNN's prediction to its input features. Integrated gradients differentiate between artifacts that stem from perturbing the data, a misbehaving model and a misbehaving attribution method. This is distinguished from the previous visualization methods, which are characterized by intuitive design and empirical evaluations (Mukund, Ankur, and Qiqi 2017). Hence, applying integrated gradients is a desired visualization methodology to verify the advancement of PCONV.

The integral of integrated gradients is efficiently approximated via a summation. We sum the gradients at points occurring at sufficiently small intervals along the straight-line path from the baseline's x' to the input x:

$$\text{IntegratedGrads}_i^{approx}(x) :: = (x_i - x'_i) \times \sum_{k=1}^{m} \frac{\partial F\left(x' + \frac{k}{m} \times (x - x')\right)}{\partial x_i} \times \frac{1}{m} \quad (14)$$

Here m is the number of steps in the Riemann approximation of the integral. In practice, the recommended value of m is m € [20, 300] (Mukund, Ankur, and Qiqi 2017). We set m=100 steps and compute the integrated gradients.

Figure 10A:
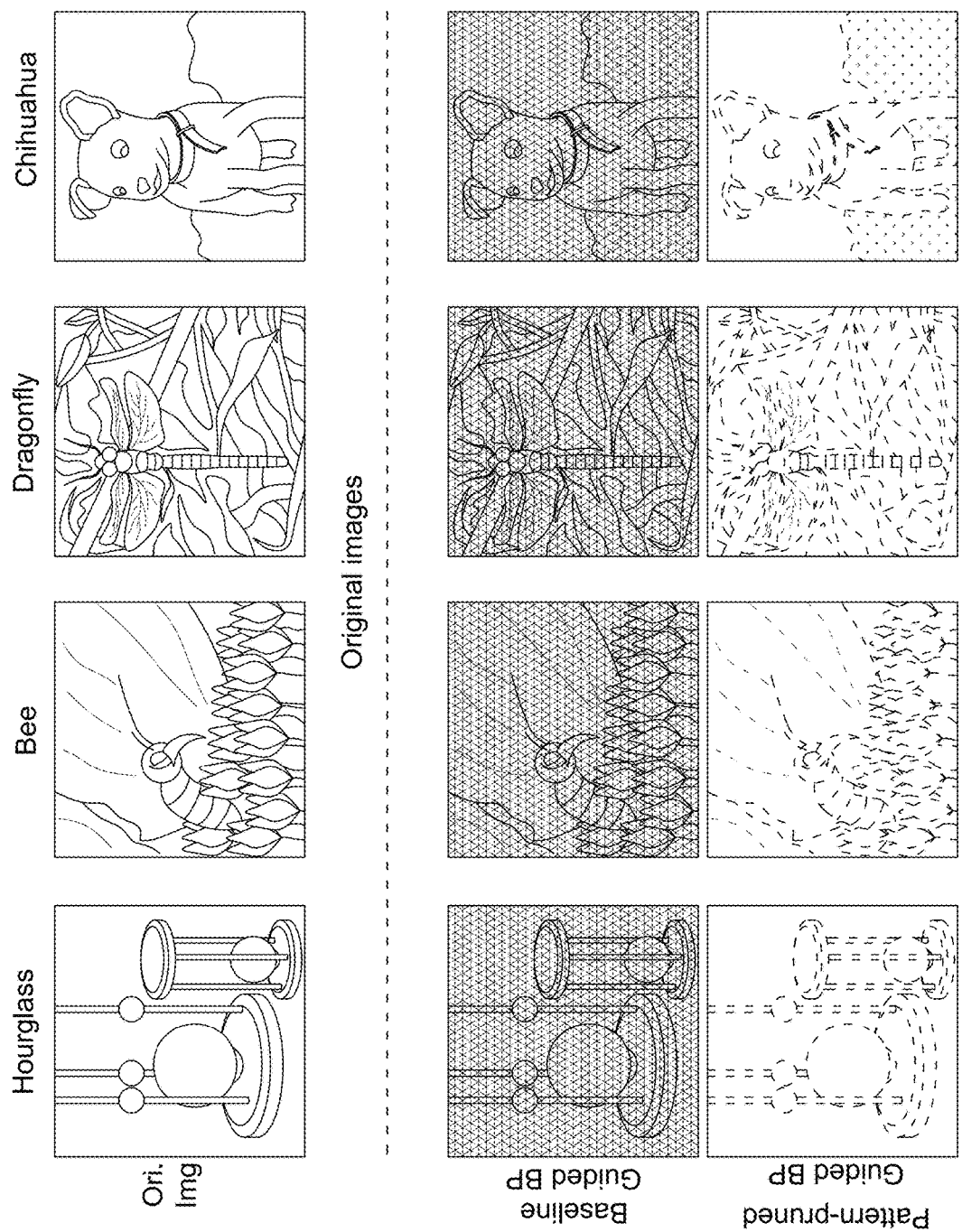

FIG. 10B visualizes the integrated gradients from the original VGG-16 model and the pattern pruned VGG-16 model. By contrast, the pattern pruned VGG-16 model learns more comprehensive information, according to the visualization of integrated gradients.

Inverted representation originates from the following question: given an encoding of an image, to which extent is it possible to reconstruct the image itself through the DNN? (Aravindh and Andrea 2015) has shown that several layers in DNN retrain photographically accurate information about the image, with different degrees of geometric and photometric invariance. Hence, we utilize inverted representation to interpret the difference between original VGG-16 model and pattern pruned VGG-16 model.

The visualization results of inverted representation are demonstrated in FIG. 10 (c). We can clearly see that the pattern pruned VGG-16 model retains more photographically accurate information.

After visualizing the original DNN models and pattern pruned DNN models through different visualization methods, we conclude that by applying our designed SCPs, pattern pruning enhances DNNs' image processing ability.

Figure 17:
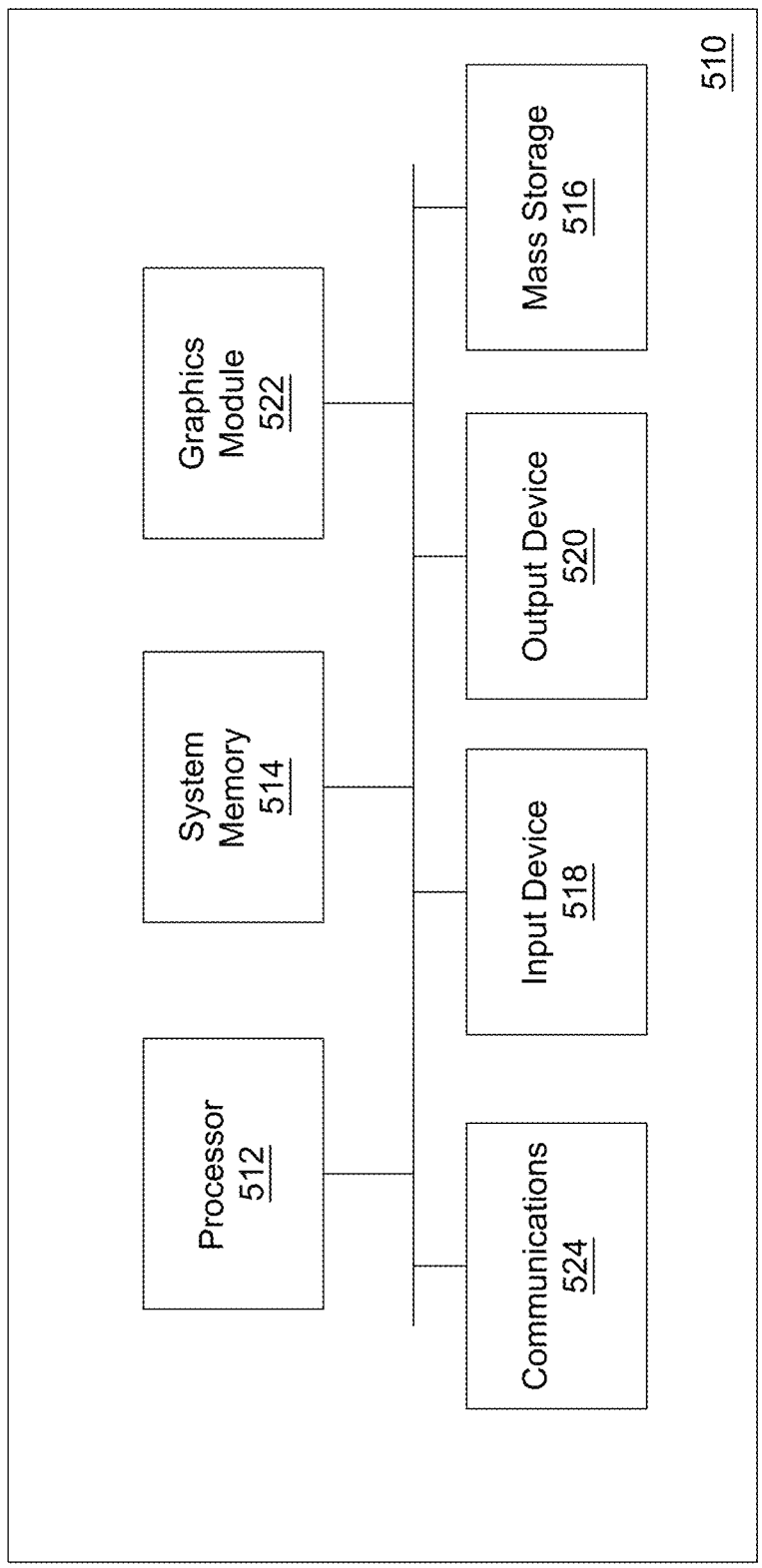
FIG. 17 is a block diagram illustrating an exemplary computer system in which the methods described herein in accordance with one or more embodiments can be implemented.

The methods, operations, modules, and systems described herein for DNN weight pruning may be implemented in one or more computer programs executing on a programmable computer system. FIG. 17 is a simplified block diagram illustrating an exemplary computer system 510, on which the one or more computer programs may operate as a set of computer instructions. The computer system 510 includes, among other things, at least one computer processor 512, system memory 514 (including a random access memory and a read-only memory) readable by the processor 512. The computer system 510 also includes a mass storage device 516 (e.g., a hard disk drive, a solid-state storage device, an optical disk device, etc.). The computer processor 512 is capable of processing instructions stored in the system memory or mass storage device. The computer system additionally includes input/output devices 518, 520 (e.g., a display, keyboard, pointer device, etc.), a graphics module 522 for generating graphical objects, and a communication module or network interface 524, which manages communication with other devices via telecommunications and other networks.

Each computer program can be a set of instructions or program code in a code module resident in the random access memory of the computer system. Until required by the computer system, the set of instructions may be stored in the mass storage device or on another computer system and downloaded via the Internet or other network.

Having thus described several illustrative embodiments, it is to be appreciated that various alterations, modifications, and improvements will readily occur to those skilled in the art. Such alterations, modifications, and improvements are intended to form a part of this disclosure, and are intended to be within the spirit and scope of this disclosure. While some examples presented herein involve specific combinations of functions or structural elements, it should be understood that those functions and elements may be combined in other ways according to the present disclosure to accomplish the same or different objectives. In particular, acts, elements, and features discussed in connection with one embodiment are not intended to be excluded from similar or other roles in other embodiments.

Additionally, elements and components described herein may be further divided into additional components or joined together to form fewer components for performing the same functions. For example, the computer system may comprise one or more physical machines, or virtual machines running on one or more physical machines. In addition, the computer system may comprise a cluster of computers or numerous distributed computers that are connected by the Internet or another network.

Accordingly, the foregoing description and attached drawings are by way of example only, and are not intended to be limiting.

REFERENCES https://github.com/alibaba/MNN.
Aravindh, M., and Andrea, V. 2015. Understanding deep image representations by inverting them. In Computer Vision and Pattern Recognition, 2015. CVPR 2015. IEEE Conference on.
Boticki, I., and So, H.-J. 2010. Quiet captures: A tool for capturing the evidence of seamless learning with mobile devices. In International Conference of the Learning Sciences-Volume 1.
Boyd, S.; Parikh, N.; Chu, E.; Peleato, B.; and Eckstein, J. 2011. Distributed optimization and statistical learning via the alternating direction method of multipliers. Foundations and Trends in Machine Learning 3 (1): 1-122.
C. Blakemore, and Campbell, F. W. 1969. On the existence of neurons in the human visual system selectively sensitive to the orientation and size of retinal images. In The Journal of Physiology. The Physiological Society.
Chen, T.; Moreau, T.; Jiang, Z.; Zheng, L.; Yan, E.; Shen, H.; Cowan, M.; Wang, L.; Hu, Y.; Ceze, L.; et al. 2018. TVM: An automated end-to-end optimizing compiler for deep learning. In OSDI.
Dai, X.; Yin, H.; and Jha, N. K. 2017. Nest: a neural network synthesis tool based on a grow-and-prune paradigm. arXiv preprint arXiv: 1711.02017.
Freeman, W., and Adelson, E. 1991. The design and use of steerable filters. In IEEE Transactions on Pattern Analysis and Machine Intelligence, volume 13, 891-906. IEEE.
Goodfellow, I.; Bengio, Y.; Courville, A.; and Bengio, Y. 2016. Deep learning, volume 1. MIT press Cambridge.
Han, S.; Pool, J.; Tran, J.; and Dally, W. 2015. Learning both weights and connections for efficient neural network. In Advances in Neural Information Processing Systems, 1135-1143.
Han, S.; Mao, H.; and Dally, W. J. 2015. Deep compression: Compressing deep neural networks with pruning, trained quantization and huffman coding. ar Xiv preprint arXiv: 1510.00149.
He, K.; Zhang, X.; Ren, S.; and Sun, J. 2016. Deep residual learning for image recognition. In Proceedings of the IEEE Conference on Computer Vision and Pattern Recognition, 770-778.
He, Y.; Lin, J.; Liu, Z.; Wang, H.; Li, L.-J.; and Han, S. 2018. Amc: Automl for model compression and acceleration on mobile devices. In European Conference on Computer Vision, 815-832.
He, Y.; Liu, P.; Wang, Z.; Hu, Z.; and Yang, Y. 2019. Filter pruning via geometric median for deep convolutional neural networks acceleration. In Proceedings of the IEEE Conference on Computer Vision and Pattern Recognition, 4340-4349.
He, Y.; Zhang, X.; and Sun, J. 2017. Channel pruning for accelerating very deep neural networks. In Computer Vision (ICCV), 2017 IEEE International Conference on, 1398-1406. IEEE.
Hinton, G.; Deng, L.; and Yu, D. e. a. 2012. Deep neural networks for acoustic modeling in speech recognition: The shared views of four research groups. IEEE Signal Processing Magazine.
Howard, A. G.; Zhu, M.; Chen, B.; Kalenichenko, D.; Wang, W.; Weyand, T.; Andreetto, M.; and Adam, H. 2017. Mobilenets: Efficient convolutional neural networks for mobile vision applications. arXiv preprint arXiv: 1704.04861.
Hu, H.; Peng, R.; Tai, Y.-W.; and Tang, C.-K. 2016. Network trimming: A data-driven neuron pruning ap-proach towards efficient deep architectures. arXiv preprint arXiv: 1607.03250.
Huang, Z., and Wang, N. 2018. Data-driven sparse structure selection for deep neural networks. In Proceedings of the European Conference on Computer Vision (ECCV).
Kingma, D. P., and Ba, J. 2014. Adam: A method for stochastic optimization. In Proceedings of the International Conference on Learning Representations (ICLR).
Krizhevsky, A.; Sutskever, I.; and Hinton, G. E. 2012. Imagenet classification with deep convolutional neural networks. In NeurIPS.
Lane, N. D.; Bhattacharya, S.; Georgiev, P.; Forlivesi, C.; and Kawsar, F. 2015. An early resource characterization of deep learning on wearables, smartphones and internet-of-things devices. In International workshop on IoT towards applications.
Li, H.; Kadav, A.; Durdanovic, I.; Samet, H.; and Graf, H. P. 2016. Pruning filters for efficient convnets. ar Xiv preprint arXiv: 1608.08710.
Liu, B.; Wang, M.; Foroosh, H.; Tappen, M.; and Pensky, M. 2015. Sparse convolutional neural networks. In CVPR, 806-814.
Liu, Z.; Sun, M.; Zhou, T.; Huang, G.; and Darrell, T. 2018. Rethinking the value of network pruning. arXiv preprint arXiv: 1810.05270.

Luo, J.-H.; Wu, J.; and Lin, W. 2017. Thinet: A filter level pruning method for deep neural network compression. In Proceedings of the IEEE international conference on computer vision, 5058-5066.

Mairal, J.; Koniusz, P.; Harchaoui, Z.; and Schmid, C. 2014. Convolutional kernel networks. In NeurIPS.

Mao, H.; Han, S.; Pool, J.; Li, W.; Liu, X.; Wang, Y.; and Dally, W. J. 2017. Exploring the regularity of sparse structure in convolutional neural networks. arXiv preprint arXiv: 1705.08922.

Min, C.; Wang, A.; Chen, Y.; Xu, W.; and Chen, X. 2018. 2pfpce: Two-phase filter pruning based on conditional entropy. arXiv preprint arXiv: 1809.02220.

Mukund, S.; Ankur, T.; and Qiqi, Y. 2017. Axiomatic attribution for deep networks. In 2017 International Conference on Machine Learning (ICML). ACM/IEEE.

Parashar, A.; Rhu, M.; Mukkara, A.; Puglielli, A.; Venkatesan, R.; Khailany, B.; Emer, J.; Keckler, S. W.; and Dally, W. J. 2017. Scnn: An accelerator for compressed-sparse convolutional neural networks. In ISCA.

Philipp, D.; Durr, F.; and Rothermel, K. 2011. A sensor network abstraction for flexible public sensing systems. In 2011 IEEE Eighth International Conference on Mobile Ad-Hoc and Sensor Systems, 460-469. IEEE.

Ren, S.; He, K.; Girshick, R.; and Sun, J. 2015. Faster r-cnn: Towards real-time object detection with region proposal networks. In Advances in neural information processing systems, 91-99.

Ren, A.; Zhang, T.; Ye, S.; Xu, W.; Qian, X.; Lin, X.; and Wang, Y. 2019. Admm-nn: an algorithm-hardware co-design framework of dnns using alternating direction methods of multipliers. In ASPLOS.

Selvaraju, R. R.; Cogswell, M.; Das, A.; Vedantam, R.; Parikh, D.; and Batra, D. 2017. Grad-cam: Visual explanations from deep networks via gradient-based localization. In ICCV.

Simonyan, K., and Zisserman, A. 2014. Very deep convolutional networks for large-scale image recognition. arXiv preprint arXiv: 1409.1556.

Siyuan, M.; Raef, B.; and Mikhail, B. 2018. The power of interpolation: Understanding the effectiveness of sgd in modern over-parametrized learning. In 2018 International Conference on Machine Learning (ICML). ACM/IEEE.

Springenberg, J. T., and Alexey Dosovitskiy, T. B. a. R. 2015. Striving for simplicity: The all convolutional net. In ICLR-2015 workshop track.

https://www.tensorflow.org/mobile/tflite/.

Wen, W.; Wu, C.; Wang, Y.; Chen, Y.; and Li, H. 2016. Learning structured sparsity in deep neural networks. In Advances in neural information processing systems, 2074-2082.

Xu, M.; Zhu, M.; Liu, Y.; Lin, F. X.; and Liu, X. 2018. Deep-cache: Principled cache for mobile deep vision. In Proceedings of the 24th Annual International Conference on Mobile Computing and Networking, 129-144. ACM.

Yamins, D. L., and DiCarlo, J. J. 2016. Using goal-driven deep learning models to understand sensory cortex. Nature neuroscience 19 (3): 356.

Yao, S.; Hu, S.; Zhao, Y.; Zhang, A.; and Abdelzaher, T. 2017. Deepsense: A unified deep learning framework for time-series mobile sensing data processing. In Proceedings of the 26th International Conference on World Wide Web.

Yu, R.; Li, A.; Chen, C.-F.; Lai, J.-H.; Morariu, V. I.; Han, X.; Gao, M.; Lin, C.-Y.; and Davis, L. S. 2018. Nisp: Pruning networks using neuron importance score propagation. In Proceedings of the IEEE Conference on Computer Vision and Pattern Recognition, 9194-9203.

Zhang, T.; Ye, S.; Zhang, Y.; Wang, Y.; and Fardad, M. 2018. Systematic weight pruning of dnns using alternating direction method of multipliers. arXiv preprint arXiv: 1802.05747.

Zhang, R. 2019. Making convolutional networks shift-invariant again. In ICML.

The invention claimed is:

1. A computer-implemented method for compressing a deep neural network (DNN) model by DNN weight pruning to accelerate DNN inference on mobile devices, the method comprising the steps of:
   (a) performing an intra-convolution kernel pruning of the DNN model wherein a fixed number of weights are pruned in each convolution kernel of the DNN model to generate sparse convolution patterns;
   (b) performing inter-convolution kernel pruning of the DNN model to generate connectivity sparsity, wherein inter-convolution kernel pruning comprises removing at least one kernel corresponding to a given input channel and a given output channel to cut connections between the given input channel and the given output channel of the DNN model to remove corresponding kernels, wherein said removing the at least one kernel comprises:
   retaining at least one kernel for each filter, and
   reducing a length of each filter;
   (c) training the DNN model compressed in steps (a) and (b); and
   (d) removing memory-level load redundancy corresponding to the DNN model trained in (c).

2. The method of claim 1, further comprising applying a compiler-assisted DNN inference framework to the compressed DNN model to generate code to be executed on the mobile device to accelerate DNN inference.

3. The method of claim 1, wherein intra-convolution kernel pruning produces the same sparsity ratio in each filter of the DNN model and a limited number of pattern shapes.

4. The method of claim 1, wherein (a) comprises assigning a pattern from a limited set of sparse convolution patterns to each kernel of the DNN model.

5. The method of claim 1, wherein the DNN model is deployed as an inference system for image classification, object detection, or natural language processing.

6. The method of claim 1, wherein the DNN model is pretrained.

7. The method of claim 1, wherein the DNN weight pruning comprises an intermediate sparsity dimension for the DNN model.

8. A computer system, comprising:
   at least one processor;
   memory associated with the at least one processor; and
   a program supported in the memory for compressing a deep neural network (DNN) model by DNN weight pruning to accelerate DNN inference on mobile devices, the program containing a plurality of instructions which, when executed by the at least one processor, cause the at least one processor to:
   (a) perform an intra-convolution kernel pruning of the DNN model wherein a fixed number of weights are pruned in each convolution kernel of the DNN model to generate sparse convolution patterns;
   (b) perform inter-convolution kernel pruning of the DNN model to generate connectivity sparsity, wherein inter-convolution kernel pruning comprises removing at least one kernel corresponding to a given input channel and a given output channel to cut connections between the given input channel and the given output channel of the DNN model to remove corresponding kernels, wherein said removing the at least one kernel comprises:

retaining at least one kernel for each filter, and reducing a length of each filter;

(c) train the DNN model compressed in steps (a) and (b); and (d) removing memory-level load redundancy corresponding to the DNN model trained in (c).

9. The computer system of claim 8, wherein the program further comprises instructions for comprising applying a compiler-assisted DNN inference framework to the compressed DNN model to generate code to be executed on the mobile device to accelerate DNN inference.

10. The computer system of claim 8, wherein intra-convolution kernel pruning produces the same sparsity ratio in each filter of the DNN model and a limited number of pattern shapes.

11. The computer system of claim 8, wherein (a) comprises assigning a pattern from a limited set of sparse convolution patterns to each kernel of the DNN model.

12. The computer system of claim 8, wherein the DNN model is deployed as an inference system for image classification, object detection, or natural language processing.

13. The computer system of claim 8, wherein the DNN model is pretrained.

14. The computer system of claim 8, wherein the DNN weight pruning comprises an intermediate sparsity dimension for the DNN model.

15. A computer program product for compressing a deep neural network (DNN) model by DNN weight pruning to accelerate DNN inference on mobile devices, said computer program product residing on a non-transitory computer readable medium having a plurality of instructions stored thereon which, when executed by a computer processor, cause that computer processor to:

(a) perform an intra-convolution kernel pruning of the DNN model wherein a fixed number of weights are pruned in each convolution kernel of the DNN model to generate sparse convolution patterns;

(b) perform inter-convolution kernel pruning of the DNN model to generate connectivity sparsity, wherein inter-convolution kernel pruning comprises removing at least one kernel corresponding to a given input channel and a given output channel to cut connections between the given input channel and the given output channel of the DNN model to remove corresponding kernels, wherein said removing the at least one kernel comprises:

retaining at least one kernel for each filter, and reducing a length of each filter;

(c) train the DNN model compressed in steps (a) and (b); and (d) removing memory-level load redundancy corresponding to the DNN model trained in (c).

16. The computer program product of claim 15, wherein the program further comprises instructions for comprising applying a compiler-assisted DNN inference framework to the compressed DNN model to generate code to be executed on the mobile device to accelerate DNN inference.

17. The computer program product of claim 15, wherein intra-convolution kernel pruning produces the same sparsity ratio in each filter of the DNN model and a limited number of pattern shapes.

18. The computer program product of claim 15, wherein (a) comprises assigning a pattern from a limited set of sparse convolution patterns to each kernel of the DNN model.

* * * * *